(12) United States Patent
Lee et al.

(10) Patent No.: US 8,274,959 B2
(45) Date of Patent: Sep. 25, 2012

(54) METHOD FOR TRANSMITTING LOCATION BASED SERVICE—REFERENCE SIGNAL IN WIRELESS COMMUNICATION SYSTEM AND APPARATUS THEREFOR

(75) Inventors: Dae Won Lee, Gyeonggi-do (KR); Young Woo Yun, Gyeonggi-do (KR); Byung Hoon Kim, Gyeonggi-do (KR); Joon Kui Ahn, Gyeonggi-do (KR); Ki Jun Kim, Gyeonggi-do (KR); Bong Hoe Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 277 days.

(21) Appl. No.: 12/725,170

(22) Filed: Mar. 16, 2010

(65) Prior Publication Data
US 2010/0239034 A1    Sep. 23, 2010

Related U.S. Application Data

(60) Provisional application No. 61/161,041, filed on Mar. 17, 2009, provisional application No. 61/161,396, filed on Mar. 18, 2009, provisional application No. 61/162,330, filed on Mar. 22, 2009, provisional application No. 61/165,522, filed on Apr. 1, 2009.

(30) Foreign Application Priority Data

Dec. 29, 2009 (KR) .................. 10-2009-0132749

(51) Int. Cl.
*H04Q 7/24* (2006.01)

(52) U.S. Cl. ...... 370/338; 370/343; 370/468; 455/456.3
(58) Field of Classification Search .................. None
See application file for complete search history.

(56) References Cited

U.S. PATENT DOCUMENTS

| 2007/0072621 | A1 | 3/2007 | Mukkavilli et al. |
| 2007/0232324 | A1 | 10/2007 | Kim et al. |
| 2008/0310386 | A1 | 12/2008 | Venkatachalam |
| 2011/0124347 | A1* | 5/2011 | Chen et al. ................. 455/456.1 |
| 2011/0143773 | A1* | 6/2011 | Kangas et al. ............. 455/456.1 |

FOREIGN PATENT DOCUMENTS
WO    2008/084967    7/2008
* cited by examiner

*Primary Examiner* — Duc C Ho
(74) *Attorney, Agent, or Firm* — Lee, Hong, Degerman, Kang & Waimey

(57) ABSTRACT

A method for allowing a mobile station to detect a Location Based Service-Reference Signal (LBS-RS) in a wireless communication system is disclosed. The method includes receiving LBS-RS setup information of at least one target cell participating in location measurement from a serving cell, acquiring a frequency offset value of the target cell using the LBS-RS setup information, and detecting the LBS-RS transmitted from the target cell using the LBS-RS setup information and the frequency offset value. In addition, the method further includes measuring a reception delay time of the detected LBS-RS, and transmitting a reception delay time to the serving cell.

14 Claims, 34 Drawing Sheets

Time Mirrored Pattern

Certain portions of pattern may be truncated due to limitations

METHOD FOR TRANSMITTING LOCATION BASED SERVICE—REFERENCE SIGNAL IN WIRELESS COMMUNICATION SYSTEM AND APPARATUS THEREFOR

This application claims the benefit of U.S. Provisional Patent Application Nos. 61/161,041, filed on Mar. 17, 2009, 61/161,396, filed on Mar. 18, 2009, 61/162,330, filed on Mar. 22, 2009 and 61/165,522, filed on Apr. 1, 2009, and Korean Patent Application No. 10-2009-0132749, filed on Dec. 29, 2009, which is hereby incorporated by reference as if fully set forth herein.

BACKGROUND OF THE INVENTION

1. Field of the Invention

The present invention relates to a wireless communication system, and more particularly to a method for transmitting a reference signal which allows a base station of a wireless communication system to provide a location based service, and an apparatus for the method.

2. Discussion of the Related Art

Conventionally, a geographical location of a mobile station is calculated by measuring time delays of signals transmitted from a plurality of cells. Therefore, three or more signals are needed to measure the location of the mobile station. Even though a variety of methods for calculating the MS location using three or more signals are present, an observed time difference of arrival (OTDOA) technique has generally been used.

FIG. 1 is a conceptual diagram illustrating an OTDOA technique for measuring the MS location.

Referring to FIG. 1, the OTDOA technique has been used to measure the MS location using a difference in time points where signals transmitted from individual cells arrive at a mobile station. The MS measures time delays of signals received from individual cells, and reports the measured time delays to either a serving cell or an anchor cell. The serving cell measures the location of a corresponding MS using the reported time delays.

In this case, the signal transmitted from each cell to the MS is a Location Based Service-Reference Signal (LBS-RS), and the MS must identify the LBS-RS received from each cell. In addition, when establishing the LBS-RS transmitted from each cell to the MS, a reception power and time delay of the LBS-RS must be considered. In order to allow the MS to more effectively detect the LBS-RS received from each cell, a method for generating the LBS-RS sequence and a resource allocation method need to be considered.

SUMMARY OF THE INVENTION

Accordingly, the present invention is directed to a method and apparatus for transmitting a location based service-reference signal (LBS-RS) in a wireless communication system, that substantially obviate one or more problems due to limitations and disadvantages of the related art.

An object of the present invention devised to solve the problem lies on a method and apparatus for transmitting the LBS-RS in a wireless communication system, such that a base station can provide a location based service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The object of the present invention can be achieved by providing a method for allowing a mobile station to detect a location based service-reference signal (LBS-RS) in a wireless communication system, the method including receiving LBS-RS setup information of at least one target cell participating in location measurement from a serving cell, acquiring a frequency offset value of the target cell using the LBS-RS setup information, and detecting the LBS-RS transmitted from the target cell using the LBS-RS setup information and the frequency offset value. The LBS-RS setup information may be received through any one of a system information block, a radio resource control (RRC) layer message, a media access control (MAC) layer message, and a downlink physical control channel. The LBS-RS setup information may include a bandwidth value of the LBS-RS, cyclic prefix (CP) length information, and information about a number of transmission antennas of a neighbor cell.

The method may further include measuring a reception delay time of the detected LBS-RS, and transmitting a reception delay time to the serving cell.

The LBS-RS setup information may be an indicator of whether the LBS-RS setup information of the target cell is identical to the LBS-RS setup information of the serving cell. The indicator may include one bit information about a bandwidth of the LBS-RS, one bit information about a cyclic prefix (CP) length, and one bit information about a number of transmission antennas of a neighbor cell.

In another aspect of the present invention, provided herein is a mobile station for use in a wireless communication system including a reception module for receiving location based service-reference signal (LBS-RS) setup information about at least one target cell participating in location measurement from a serving cell, a processor for acquiring a frequency offset value of the target cell using the LBS-RS setup information, detecting the LBS-RS transmitted from the target cell using not only the LBS-RS setup information but also the frequency offset value, and measuring a reception delay time of the LBS-RS, and a transmission module for transmitting the reception delay time to the serving cell. The reception module may receive the LBS-RS setup information through any one of a system information block, a radio resource control (RRC) layer message, a media access control (MAC) layer message, and a downlink physical control channel.

The LBS-RS setup information may include a bandwidth value of the LBS-RS, cyclic prefix (CP) length information, and information about a number of transmission antennas of a neighbor cell.

The LBS-RS setup information may be an indicator of whether the LBS-RS setup information of the target cell is identical to the LBS-RS setup information of the serving cell. The indicator may include one bit information about a bandwidth of the LBS-RS, one bit information about a cyclic prefix (CP) length, and one bit information about a number of transmission antennas of a neighbor cell.

In another aspect of the present invention, provided herein is a method for allowing a cell to allocate resources for a location based service-reference signal (LBS-RS) in a wireless communication system, the method including establishing an LBS-RS pattern basis block for indicating resources to be used for transmitting the LBS-RS, deciding one or more orthogonal frequency division multiplexing (OFDM) symbols where the LBS-RS pattern basis block is to be allocated within one subframe, and allocating the LBS-RS pattern basis block to the decided OFDM symbols. In this case, the LBS- RS pattern basis block may include N OFDM symbols and N subcarriers respectively corresponding to the N OFDM symbols.

The deciding of the OFDM symbols may include deciding OFDM symbols where a reference signal for a transmission antenna is not allocated. The allocating of the LBS-RS pattern basis block may include allocating a first basis block identical to the LBS-RS pattern basis block and a second basis block that is symmetrical to the LBS-RS pattern basis block on a time axis.

As can be seen from the embodiments of the present invention, a base station for use in a wireless communication system can effectively transmit an LBS-RS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DESCRIPTION OF SPECIFIC EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include a Node B (Node-B), an eNode B (eNode-B), and an access point (AP) and the like.

In a mobile communication system, the MS may receive information from the base station (BS) via a downlink, and may transmit information via an uplink. The information that is transmitted and received to and from the MS includes data and a variety of control information. There are a variety of physical channels according to categories of transmission (Tx) and reception (Rx) information of the MS.

Figure 1:
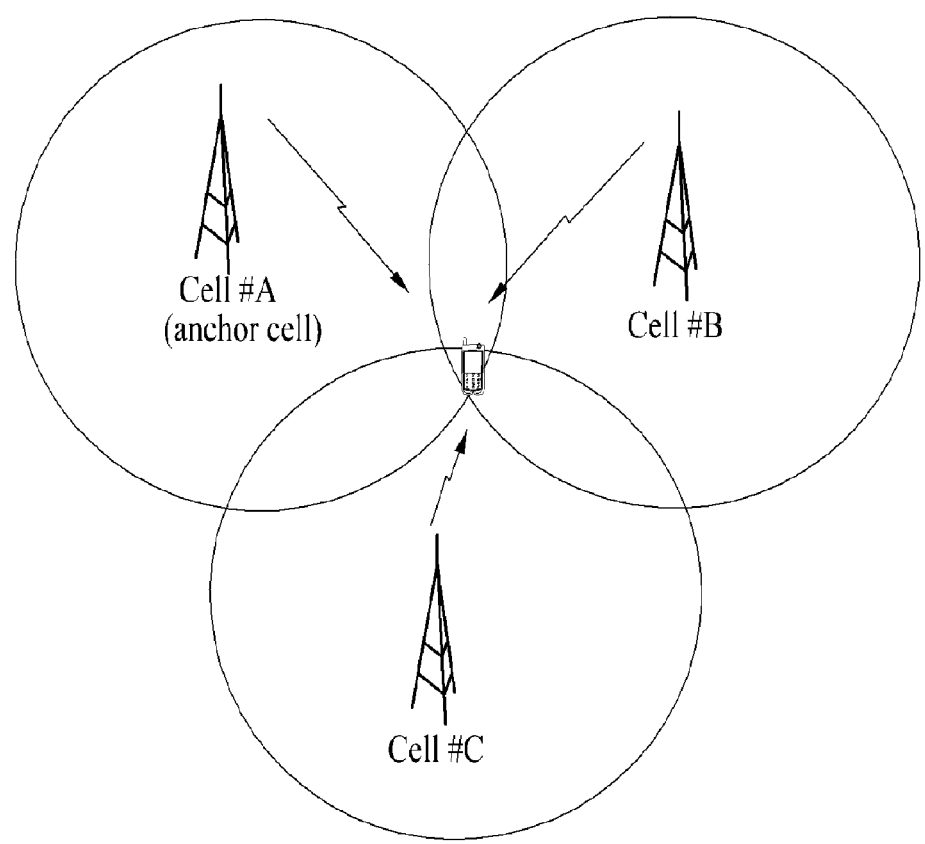
FIG. 1 is a conceptual diagram illustrating an OTDOA technique for measuring MS location.
Figure 2:
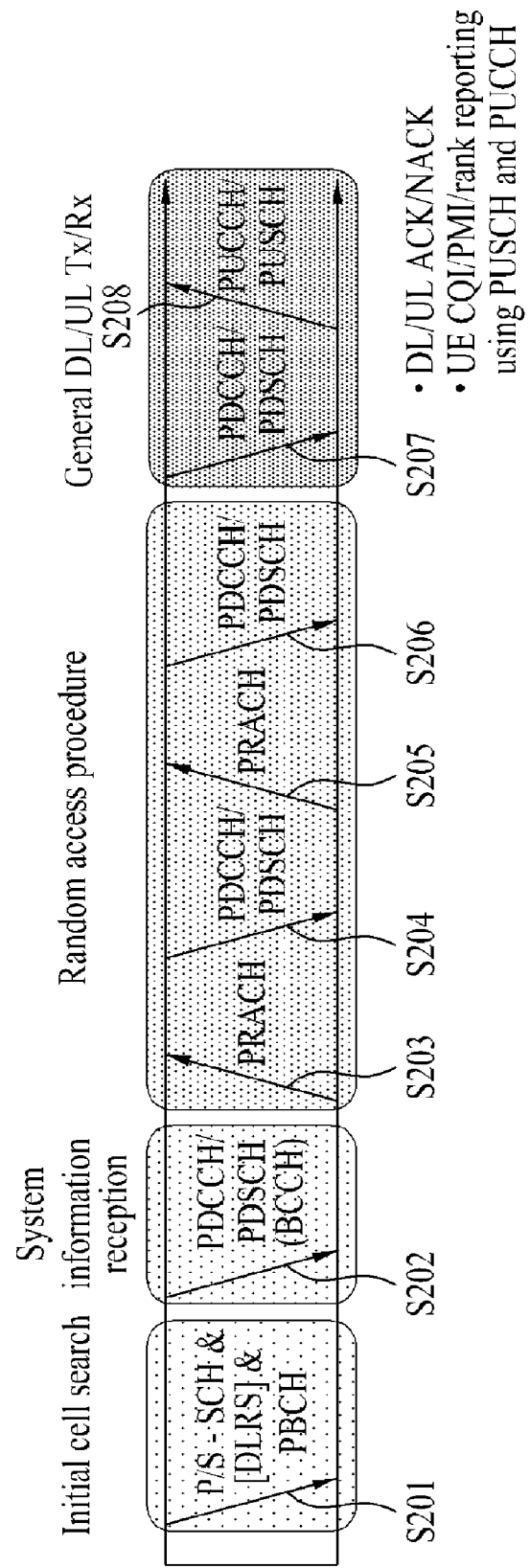
FIG. 2 shows not only physical channels for use in a $3^{rd}$ Generation Partnership Project (3GPP) system acting as an exemplary mobile communication system, but also a general signal transmission method using the physical channels according to the present invention.

FIG. 2 shows not only physical channels for use in a $3^{rd}$ Generation Partnership Project (3GPP) system acting as an exemplary mobile communication system, but also a general signal transmission method using the physical channels according to the present invention.

Referring to FIG. 2, upon power on or when entering a new cell, an MS performs initial cell search in step S201. The initial cell search involves synchronization with a BS. Specifically, the MS synchronizes its timing with the BS and acquires a cell Identifier (ID) and other information by receiving a Primary Synchronization CHannel (P-SCH) and a Secondary Synchronization CHannel (S-SCH) from the BS. Then the MS may acquire information broadcast in the cell by receiving a Physical Broadcast CHannel (PBCH) from the BS. During the initial cell search, the MS may monitor a downlink channel status by receiving a downlink Reference Signal (DL RS).

After the initial cell search, the MS may acquire more specific system information by receiving a Physical Downlink Control CHannel (PDCCH) and receiving a Physical Downlink Shared CHannel (PDSCH) based on information of the PDCCH in step S202.

On the other hand, if the MS initially accesses the BS or if the MS does not have radio resources for signal transmission, it may perform a random access procedure to the BS in steps S203 to S206. For the random access, the MS may transmit a predetermined sequence as a preamble to the BS on a Physical Random Access CHannel (PRACH) in step S203 and receive a response message for the random access on a PDCCH and a PDSCH corresponding to the PDCCH in step S204. In the case of contention-based random access other than handover, the MS may perform a contention resolution procedure by further transmitting the PRACH in step S205 and receiving a PDCCH and its related PDSCH in step S206.

After the foregoing procedure, the MS may receive a PDCCH and a PDSCH in step S207 and transmit a Physical Uplink Shared CHannel (PUSCH) and a Physical Uplink Control CHannel (PUCCH) in step S208, as a general downlink/uplink signal transmission procedure. Here, uplink control information transmitted from the MS to the BS or downlink control information transmitted from the MS to the BS may include a downlink or uplink ACKnowledgement/Negative ACKnowledgment (ACK/NACK) signal, a Channel Quality Indicator (CQI), a Precoding Matrix Index (PMI) and/or a Rank Indicator (RI). The MS adapted to operate in the 3GPP LTE system may transmit the control information such as a CQI, a PMI, and/or an RI on the PUSCH and/or the PUCCH.

In the 3GPP LTE system, a signal processing method for enabling the BS to transmit a downlink signal will hereinafter be described with reference to FIG. 3.

Figure 3:
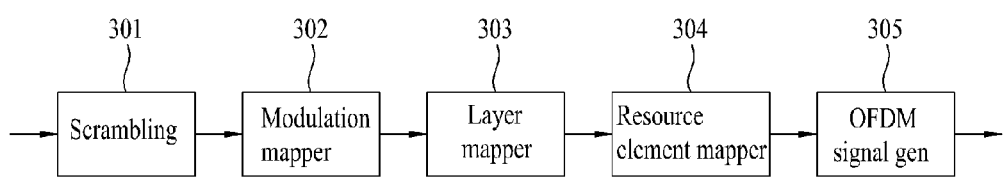
FIG. 3 is a conceptual diagram illustrating a signal processing method for allowing a base station to transmit a downlink signal according to the present invention.

FIG. 3 is a block diagram illustrating a signal processing operation for enabling the base station (BS) to transmit a downlink signal.

A base station (BS) in the 3GPP LTE system can transmit one or more codewords via a downlink. Therefore, one or more codewords may be processed as complex symbols by the scrambling module 301 and the modulation mapper 302. Thereafter, the complex symbols are mapped to a plurality of layers by the layer mapper 303, and each layer is multiplied by a predetermined precoding matrix selected according to the channel status and is then allocated to each transmission antenna by the precoding module 304. The processed transmission signals of individual antennas are mapped to time-frequency resource elements to be used for data transmission by the resource element mapper 305. Thereafter, the mapped result may be transmitted via each antenna after passing through the OFDM signal generator 306.

Figure 4:
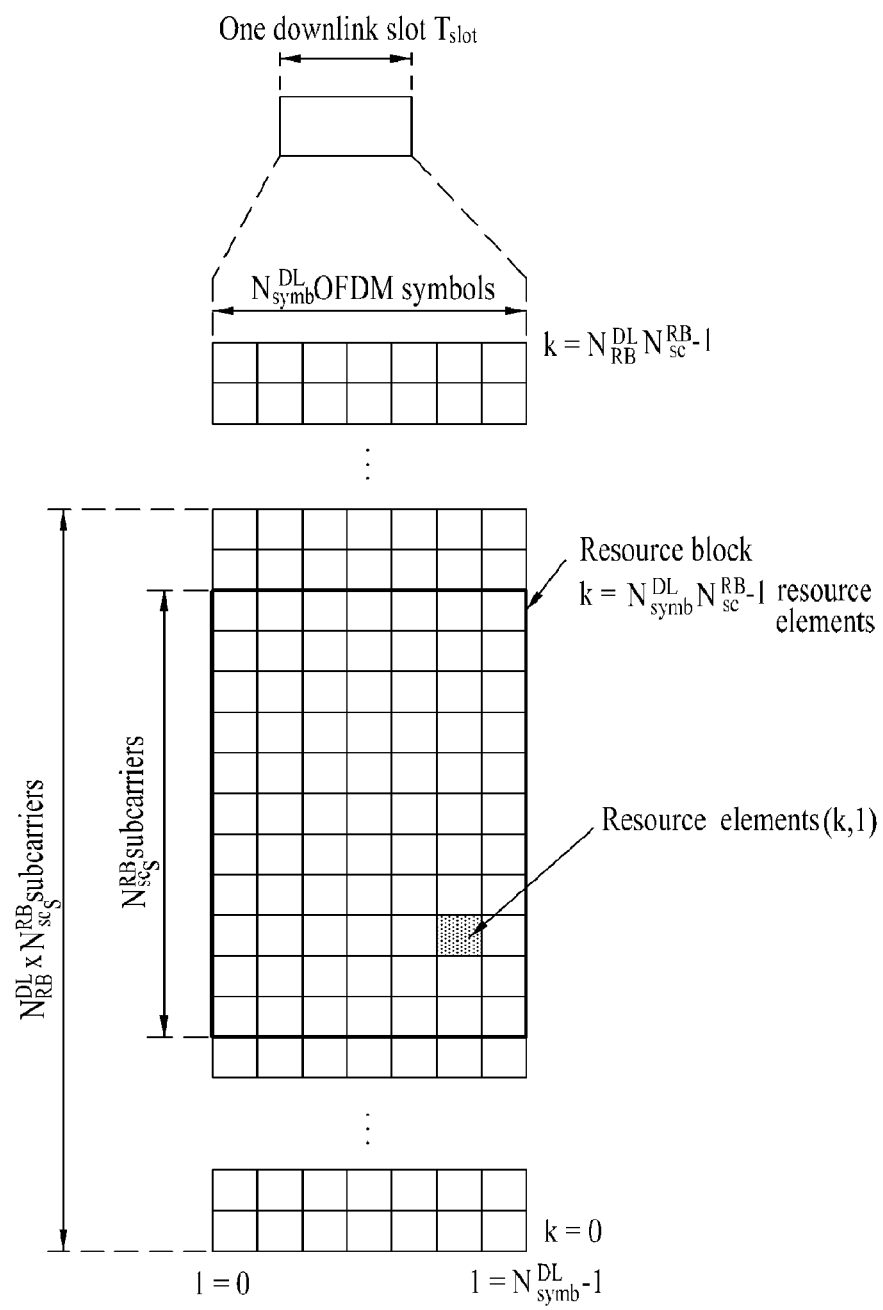
FIG. 4 shows a downlink time-frequency resource grid structure according to the present invention.

FIG. 4 shows a downlink time-frequency resource grid structure according to the present invention.

Referring to FIG. 4, downlink transmission resources can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. Each element contained in the resource grid is called a resource element (RE), and can be identified by an index pair (k,l) contained in a slot, where k is an index in a frequency domain and is set to any one of 0, ..., $N_{RB}^{DL} N_{sc}^{RB}-1$, and l is an index in a time domain and is set to any one of 0, ..., $N_{symb}^{DL}-1$.

$N_{RB}^{DL}$ varies with a downlink transmission bandwidth constructed in a cell, and must satisfy $N_{RB}^{min,DL} \leq N_{RB}^{DL} \leq N_{RB}^{max,DL}$. Here, $N_{RB}^{min,DL}$ is the smallest downlink bandwidth supported by the wireless communication system, and $N_{RB}^{max,DL}$ is the largest downlink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,UL}$ and $N_{RB}^{max,UL}$ are not limited thereto. The number of OFDM symbols contained in one slot may be differently defined according to the length of a Cyclic Prefix (CP) and the spacing between subcarriers. When transmitting data or information via multiple antennas, one resource grid for each antenna port may be defined.

Resource blocks (RBs) shown in FIG. 4 are used to describe a mapping relationship between certain physical channels and resource elements (REs). The RBs can be classified into physical resource blocks (PRBs) and virtual resource blocks (VRBs).

One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 1. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

TABLE 1

| Configuration | | $N_{SC}^{RB}$ | $N_{symb}^{DL}$ |
|---|---|---|---|
| Normal Cyclic Prefix | Δf = 15 kHz | 12 | 7 |
| Extended Cyclic Prefix | Δf = 15 kHz | | 6 |
| | Δf = 7.5 kHz | 24 | 3 |

The PRBs are assigned numbers from 0 to $N_{RB}^{DL}-1$ in the frequency domain. A PRB number $n_{PRB}$ and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

Figure 5:
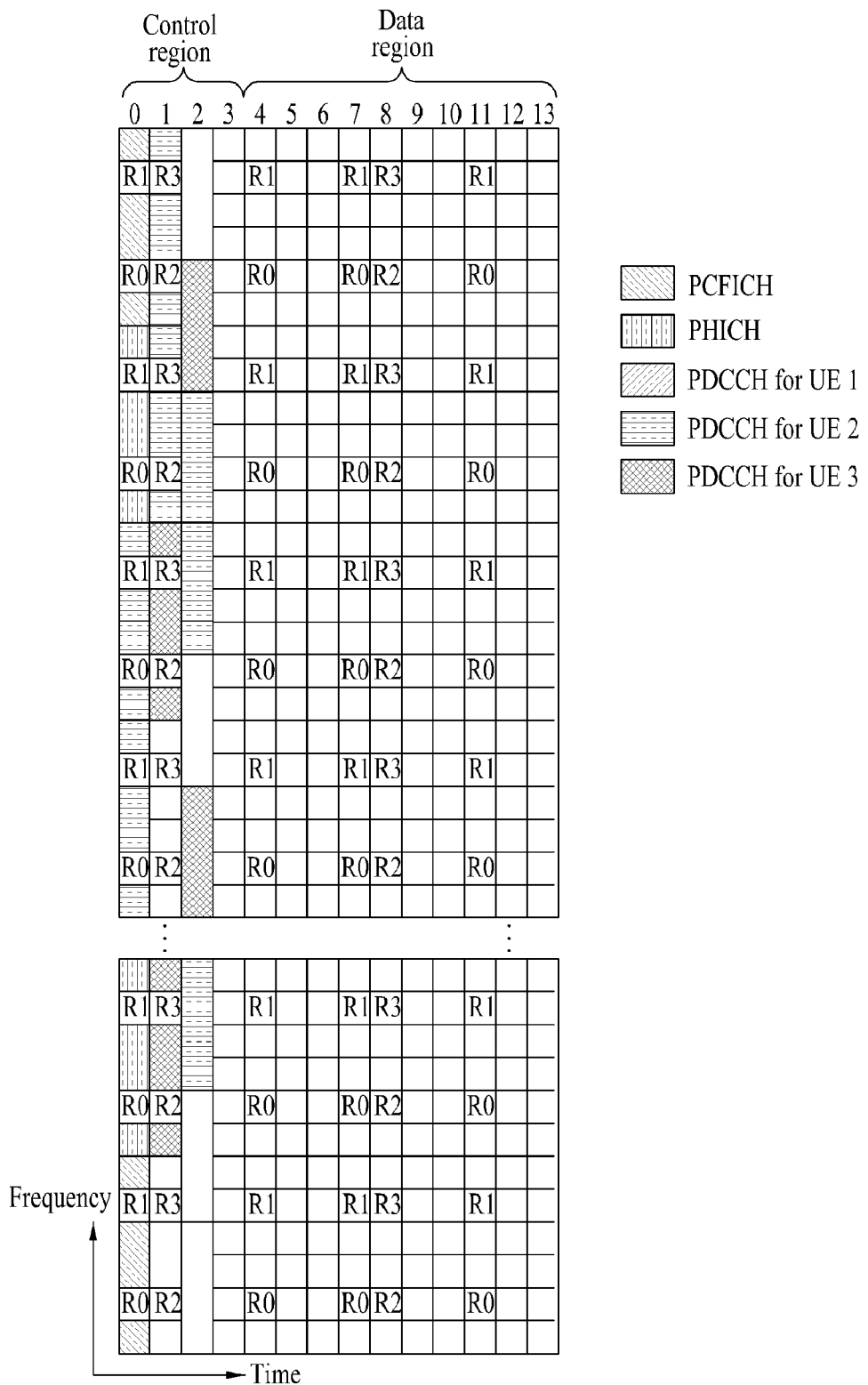
FIG. 5 shows a control channel contained in a control region of one subframe in a downlink radio frame according to the present invention.

FIG. 5 shows a control channel contained in a control region of one subframe in a downlink radio frame according to the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIG. 5, R1 to R4 represent reference signals (RSs) of antennas 0 to 3, respectively. In a general subframe, RSs of the antennas 0 to 3 are fixed to a predetermined pattern irrespective of a control region and a data region. In a multicast/broadcast over a single frequency network (MBSFN) subframe, the RSs of the antennas 0 to 3 are allocated only to the control region.

The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

The PDCCH serving as a physical downlink control channel is allocated to first n OFDM symbols of the subframe. In this case, n is an integer of greater than '1', and is indicated by PCFICH. PDCCH may be composed of one or more CCEs. An associated detailed description will be provided in the following section. The PDCCH informs MSs or an MS group of information associated with resource allocation of a Paging Channel (PCH) and a Downlink-Shared Channel (DL-SCH), uplink scheduling grant, Hybrid Automatic Repeat Request (HARQ) information, or the like. Therefore, the BS and the MS may transmit or receive data other than specific control information or specific service data over the PDSCH. Information indicating which one of MSs will receive data as an input, information indicating how the MSs receive PDSCH data, and information indicating whether the decoding is carried out are contained in the PDCCH. For example, it is assumed that a specific PDCCH is CRC-masked with a Radio Network Temporary Identity (RNTI) called "A", and information of data, that is transmitted using radio resources "B" (for example, a frequency location) and transmission format information "C" (for example, a transmission block size, a modulation scheme, coding information, etc.), is transmitted through a specific subframe. In this case, an MS located in a cell monitors PDCCH using its own RNTI information. If at least one MS having the RNTI "A" is present, the MSs receive PDCCH and receive PDSCH indicated by "B" and "C" through the received PDCCH information.

FIRST EMBODIMENT

A method for compensating for a path loss encountered when a plurality of cells transmit LBS-RS to an MS will hereinafter be described with reference to the first embodiment of the present invention.

Figure 6:
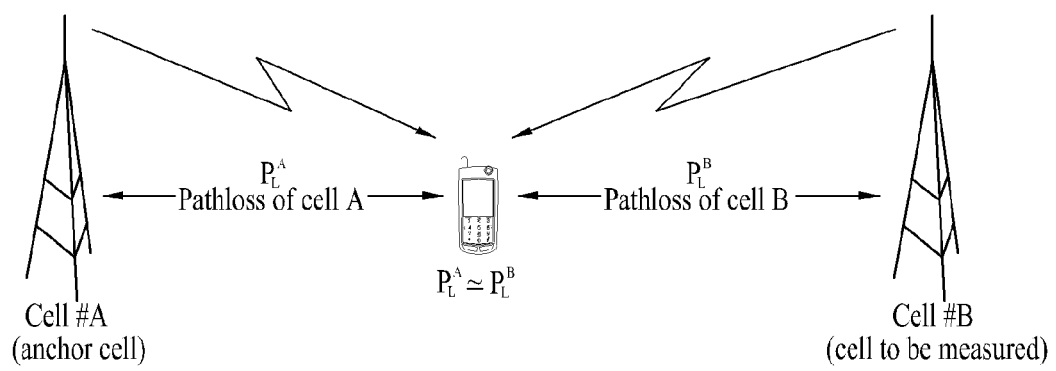
FIGS. 6 and 7 illustrate a path loss encountered in signals received from a plurality of cells according to the present invention.
Figure 7:
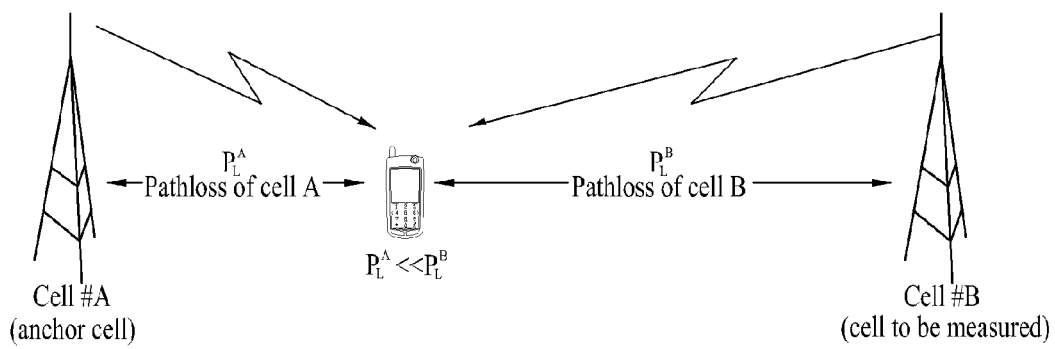

FIGS. 6 and 7 illustrate a path loss encountered in signals received from a plurality of cells according to the present invention. In the above-mentioned process for measuring the MS location, there is a need to receive LBS-RSs from one or more cells (preferably, three or more cells). For convenience of description, the following considers only two cells, that is, a serving cell and a target cell.

Under the condition that the MS is connected to a serving cell, if the MS receives LBS-RSs from both the serving cell and the target cell, the following first and second cases may be used.

The first case is shown in FIG. 6. In FIG. 6, a path loss derived from the serving cell (cell #A) is similar to another path loss derived from the target cell (cell #B). The second case is shown in FIG. 7. In FIG. 7, a path loss derived from the serving cell is less than another path loss derived from the target cell.

Referring to FIG. 6, path losses of signals, that have been transmitted from each of the serving cell and the target cell to the MS, are similar to each other, so that LBS-RSs, that have been transmitted from both cells (the serving and target cells) using the same power, can be received in the MS at similar amplitudes (i.e., similar powers). The MS receives LBS-RSs and performs a signal amplification process called automatic gain control (AGC) such that it amplifies the signal received from the target cell in such a manner that the amplified signal is appropriate for an operation range of an analog-to-digital converter (ADC). Thereafter, the MS receives an output signal from the ADC, such that it discriminates between one LBS-RS transmitted from the serving cell and the other LBS-RS transmitted from the target cell. If it is assumed that two signals are received at similar power levels as shown in FIG. 6, there are no problems when the MS detects the LBS-RS transmitted from the target cell in reception (Rx) signals.

However, in FIG. 7, a path loss between the target cell and the MS is very large, so that a signal received from the target cell is measured to be lower than another signal received from the serving cell. In the meantime, the AGC amplifies a signal in consideration of all the reception (Rx) signals received from both the serving cell and the target cell, so that the signals received from the target cell may be unexpectedly lost in the ADC process. Therefore, there is a probability that signals transmitted from the target cell are not detected under the condition of FIG. 7.

In order to solve the above-mentioned problems, the serving cell may establish an idle period or a signal non-transmitting duration. During the idle time of the serving cell, there is no influence upon the LBS-RS transmitted from the serving cell. As a result, even though the LBS-RS transmitted from the target cell causes a large path loss, this LBS-RS may be detected without any errors after having passed through the ADC process.

SECOND EMBODIMENT

The second embodiment of the present invention is devised to prevent interference between signals caused by a propagation delay of the LBS-RS transmitted from each cell.

Figure 8:
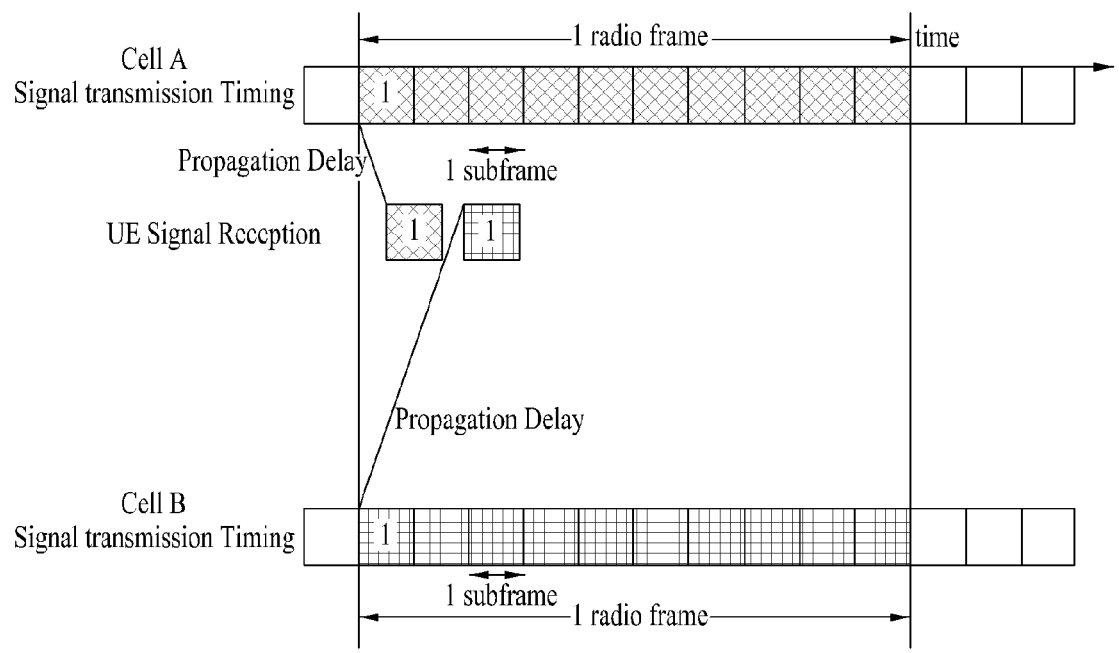
FIG. 8 is a conceptual diagram illustrating a propagation delay generated in a signal transmitted from a plurality of cells according to the present invention.

First, propagation delay will hereinafter be described in detail. FIG. 8 is a conceptual diagram illustrating a propagation delay generated in a signal transmitted from a plurality of cells according to the second embodiment of the present invention.

Referring to FIG. 8, even though a first cell A and a second cell B have transmitted respective transmission (Tx) signals at the same time, it should be noted that the transmission (Tx) signals may be received in the MS at different time points according to individual propagation paths. Specifically, FIG. 8 illustrates an exemplary case wherein the MS is located close to the cell A, and a signal received from the cell B is higher than another signal received from the cell A. Accordingly, signals received from different cells may be received in the MS at different time points.

If a maximum radius of the target cell is 100 km, a maximum propagation delay of the signal received in the MS may be set to ±0.334 ms. That is, even though synchronization among cells is established, a maximum propagation delay of ±0.334 ms may occur between LBS-RSs transmitted from respective cells to the MS.

In the case of an asynchronous system, if it is assumed that the length of one subframe is 1 ms and the reception (Rx) signal is measured in units of a subframe, it can be recognized that a maximum delay time, that may be generated between signals received from two cells, is half of one subframe, i.e., ±0.5 ms.

Figure 9:
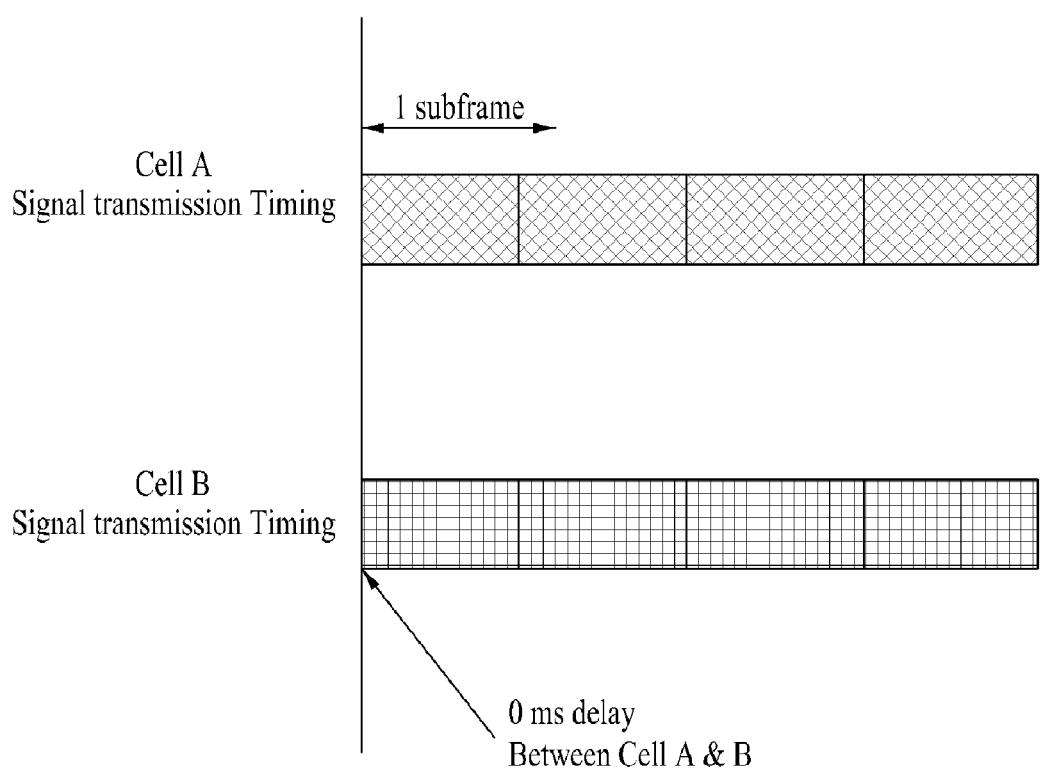
FIGS. 9 to 11 illustrate a propagation delay capable of being generated in an asynchronous system according to the present invention.
Figure 10:
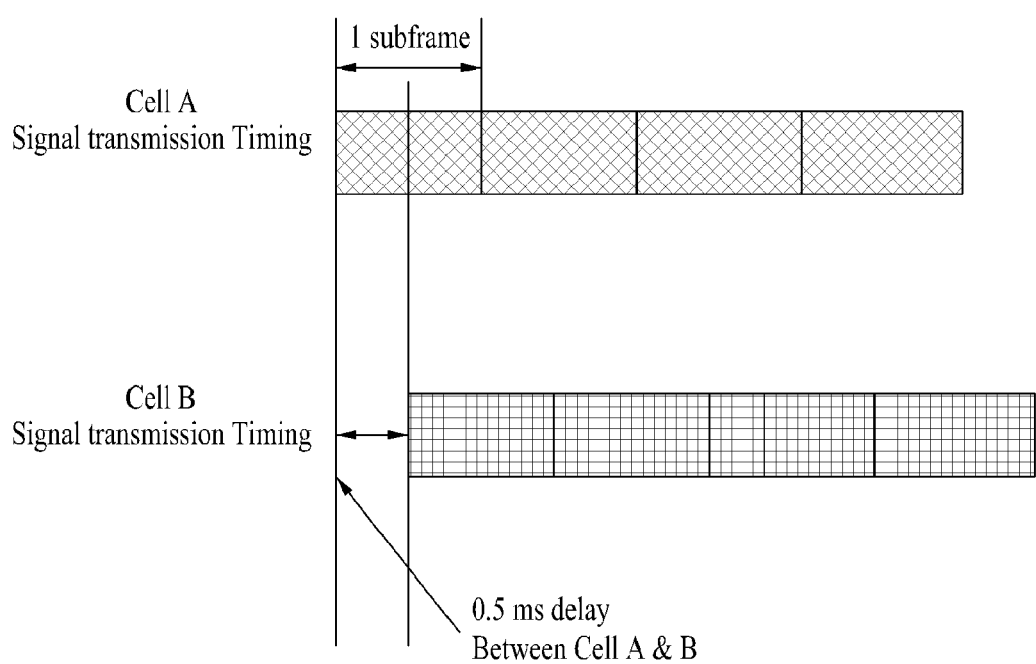
Figure 11:
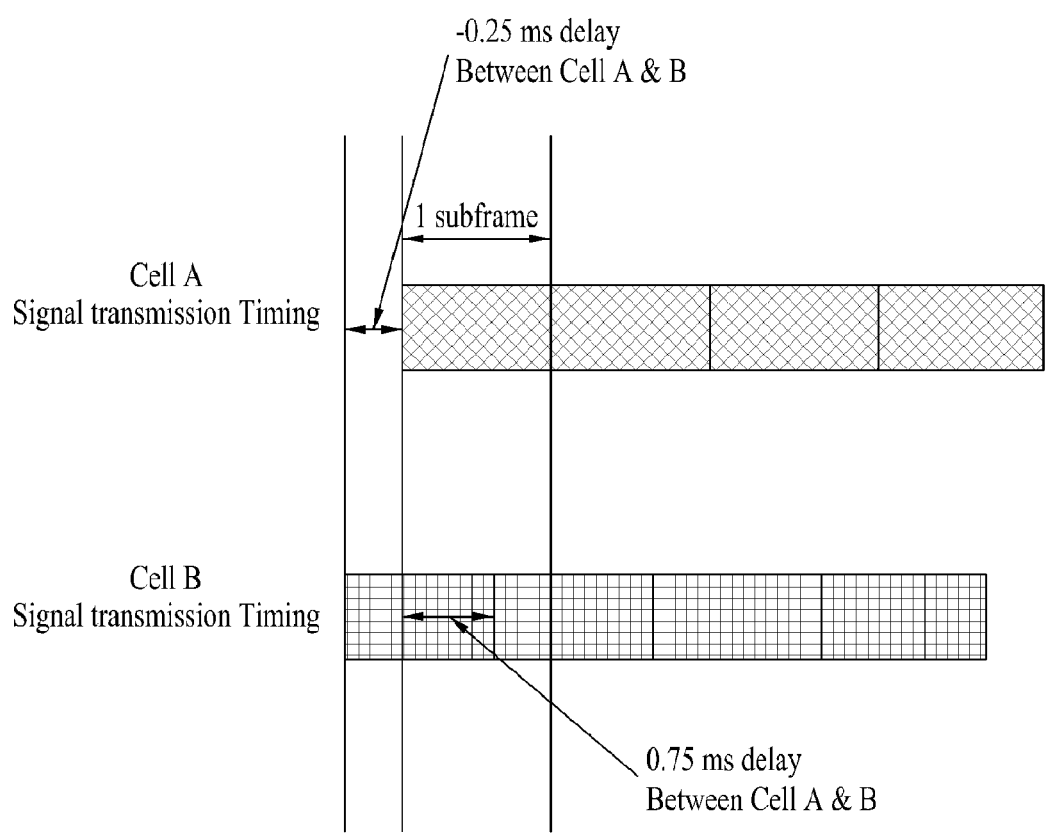

FIGS. 9 to 11 illustrate a propagation delay capable of being generated in an asynchronous system according to the present invention. Specifically, FIG. 9 illustrates that a delay time of a subframe received from the cell B on the basis of another subframe received from the cell A is set to 0 ms. FIG. 10 illustrates that a delay time of a subframe received from the cell B on the basis of another subframe received from the cell A is set to +0.5 ms. FIG. 11 illustrates that a delay time of a subframe received from the cell B on the basis of another subframe received from the cell A is set to −0.25 ms. Therefore, in order to allow the MS to receive the LBS-RS transmitted from the target cell without any interference caused by a signal transmitted from the serving cell, the second embodiment proposes a method for allowing the serving cell to establish a maximum of three idle subframes.

Figure 12:
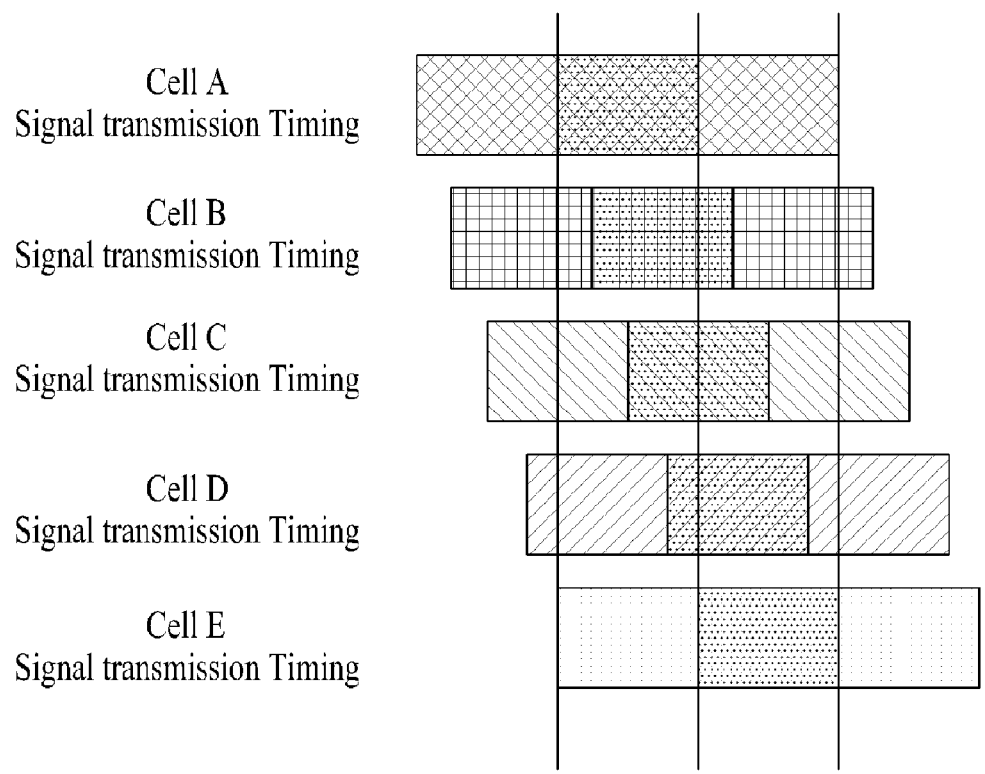
FIG. 12 illustrates a signal transmission timing of each base station according to a second embodiment of the present invention.

FIG. 12 illustrates a signal transmission timing of each base station according to a second embodiment of the present invention. Specifically, it is assumed that the MS is connected to the cell C and communicates with the cell C.

Referring to FIG. 12, a maximum delay time corresponds to half of one subframe as previously stated above, it is necessary to establish one to three consecutive idle subframes so as to receive respective signals transmitted from all cells without any interference among the received signals.

One to three consecutive subframes are established as described above, so that the MS may measure a reception delay time of the LBS-RS transmitted from each cell on the basis of a start point of a first idle subframe of the serving cell, and report the measured reception delay time to the serving cell.

THIRD EMBODIMENT

In order to allow the MS to measure a delay time of a signal transmitted from the target cell without detecting a boundary between subframes of the same signal, the serving cell may inform the MS of both the target cell ID and a rough subframe time point. In this case, the rough subframe timing may be determined by a target cell ID, a subframe number of a serving cell, and a system frame number. In addition, the serving cell may inform the MS of not only a bandwidth of the LBS-RS transmitted from the target cell but also the location of a frequency where the LBS-RS is allocated. By means of the above-mentioned information, a search process indicating which one of target cells participates in location measurement and a synchronization process for signal measurement may be omitted from the LBS-RS detection process of the MS.

Information required for measuring the MS location may be broadcast by the serving cell. In this case, information being broadcast by the serving cell may include IDs of target cells. The network has already recognized geographical locations of cells, so that the serving cell can detect cells located closest to the MS. IDs of cells incapable of contributing to location measurement in the same manner as other cells, each of which has an antenna at the same location as that of the serving cell, may not be broadcast as necessary.

FOURTH EMBODIMENT

FIGS. 13 to 18 illustrate LBS-RS patterns according to a fourth embodiment of the present invention. Specifically, empty resource elements shown in FIGS. 13 to 16 and FIG. 18 may be implemented for transmission of general data.

The fourth embodiment is characterized in that the LBS-RS pattern is designed in units of one RB.

Figure 13:
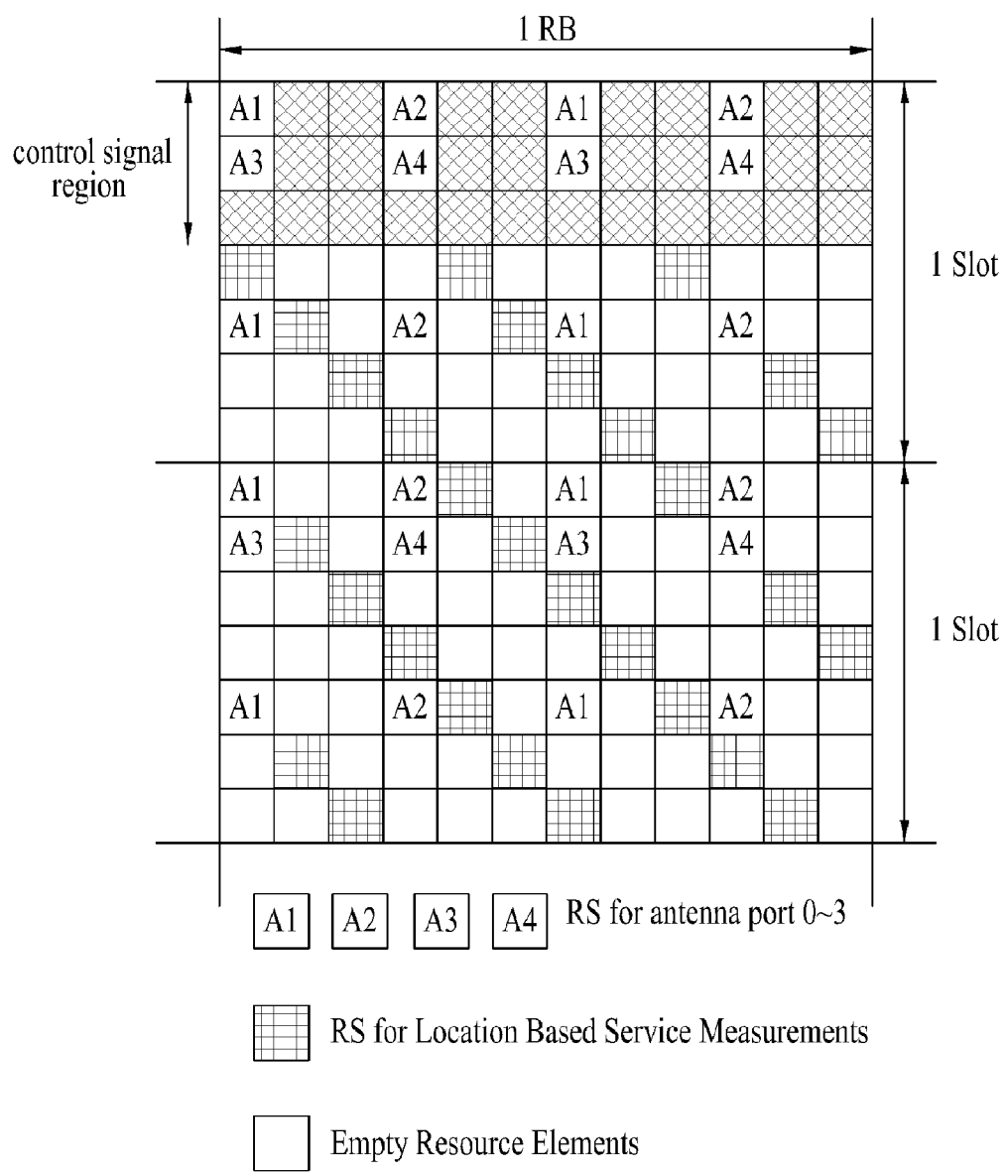
FIGS. 13 to 18 illustrate LBS-RS patterns according to a fourth embodiment of the present invention.

FIG. 13 illustrates a pattern (hereinafter referred to as a pattern A1) in which reference signals (RSs) are arranged in a diagonal direction. In particular, from the viewpoint of one OFDM symbol, several resource elements (Res) are allocated to the pattern A1 so as to implement the LBS-RS. In order to discriminate among LBS-RSs transmitted from several cells, it is necessary for a frequency offset ($V_{shift}$) of the pattern A1 to be differently established. The frequency offset ($V_{shift}$) may depend upon the cell ID, and be decided by the following equation 1.

$$v_{shift} = N_{Cell}^{ID} \bmod A \text{ (where A is a natural number in the range from 1 to 12).} \quad \text{[Equation 1]}$$

In other words, if it is assumed that a synchronized cell is made in cell planning, respective cells are established to transmit the LBS-RS using the pattern A1 having different values $v_{shift}$, such that the LBS-RS pattern having complete orthogonality between cells can be designed.

Figure 14:
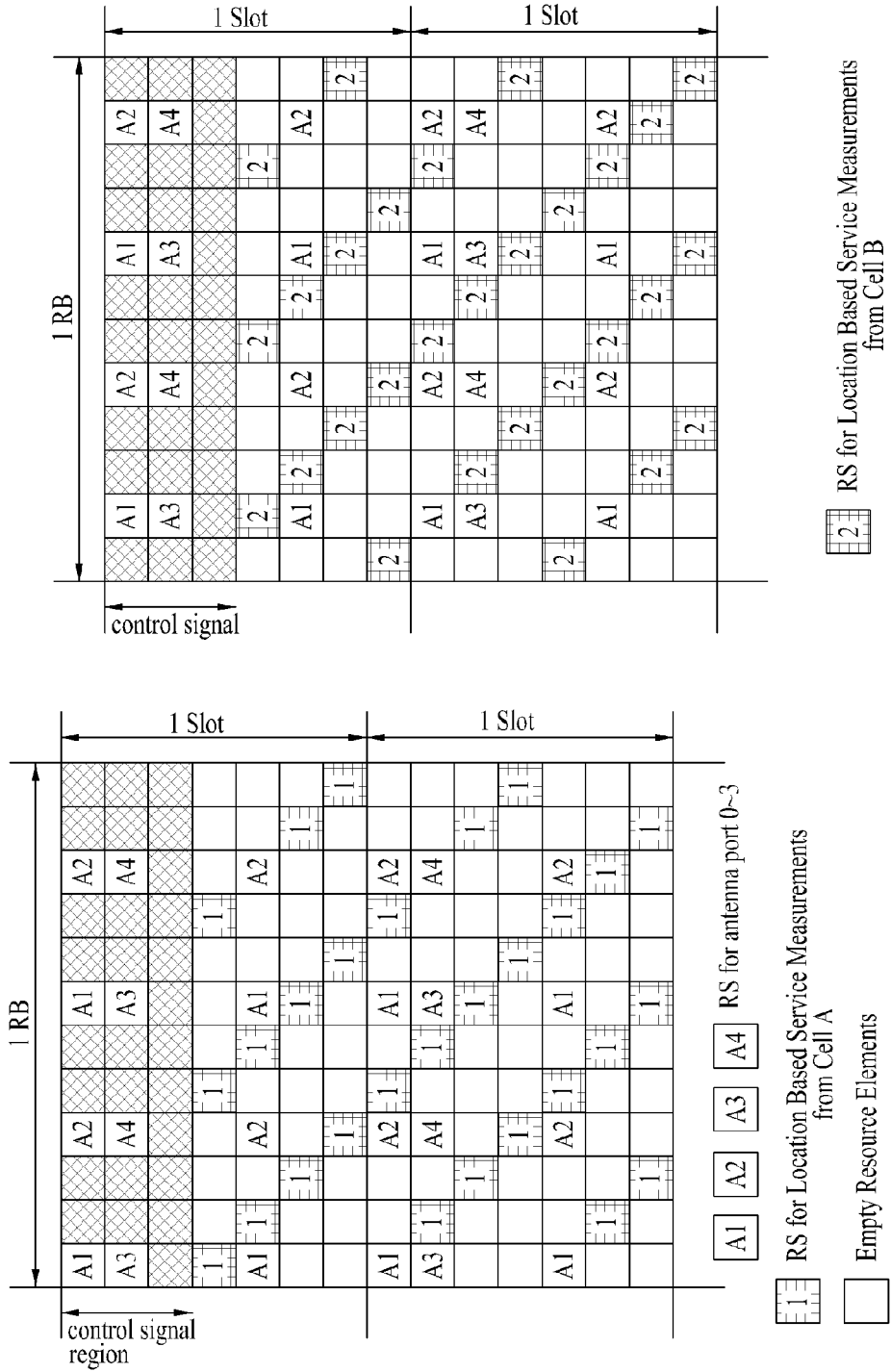

However, the pattern A1 shown in FIG. 13 has a disadvantage in that an unexpected collision may occur between LBS-RS patterns of the serving cell and the target cell due to a propagation delay of a signal. FIG. 14 is a detailed conceptual diagram illustrating the aforementioned disadvantage of the pattern A1.

Referring to FIG. 14, it is assumed that $v_{shift}$ of the cell B is set to one subcarrier spacing whereas $v_{shift}$ of the cell A is set to zero. In this case, if the LBS-RS transmitted from the cell B is delayed by one OFDM symbol due to the propagation delay, the LBS-RS patterns received from the cell A and the cell B are recognized to be identical to each other by the MS, so that it is impossible to discriminate between respective signals.

When the cell is configured, a network recognizes a rough cell radius. If a maximum radius of each cell is about 100 km, a maximum delay time that may be encountered according to the MS location is calculated to be 0.334 ms (i.e., about 4.5 OFDM symbols). Therefore, the serving cell pre-establishes a value of $v_{shift}$ of the target cell in consideration of the maximum delay time, and the serving cell informs the target cell and the MS of the established value of $v_{shift}$, such that there is no collision between LBS-RSs received in the MS.

Figure 15:
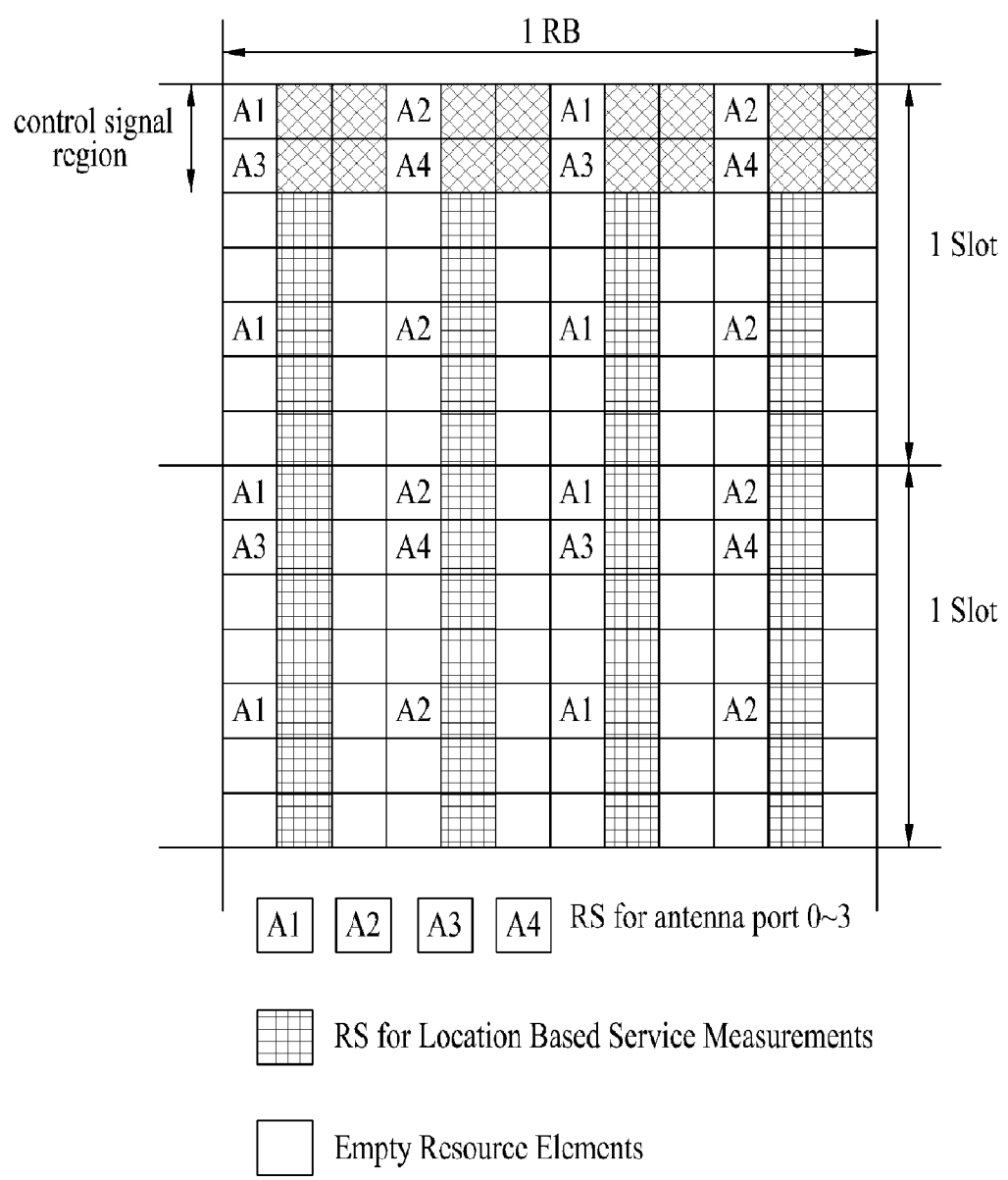

FIG. 15 illustrates another pattern (hereinafter referred to as a pattern A2) in which consecutive reference signals are arranged in a certain subcarrier. In the pattern A2, different frequency offset values $v_{shift}$ are established to discriminate between LBS-RSs transmitted from a plurality of cells. The pattern A2 has an advantage in that patterns having different values $v_{shift}$ do not collide with one another irrespective of reception delay times. As another advantage of the pattern A2, patterns having different values $v_{shift}$ can guarantee orthogonality so that performance improvement is achieved when the MS detects the LBS-RS.

Figure 16:
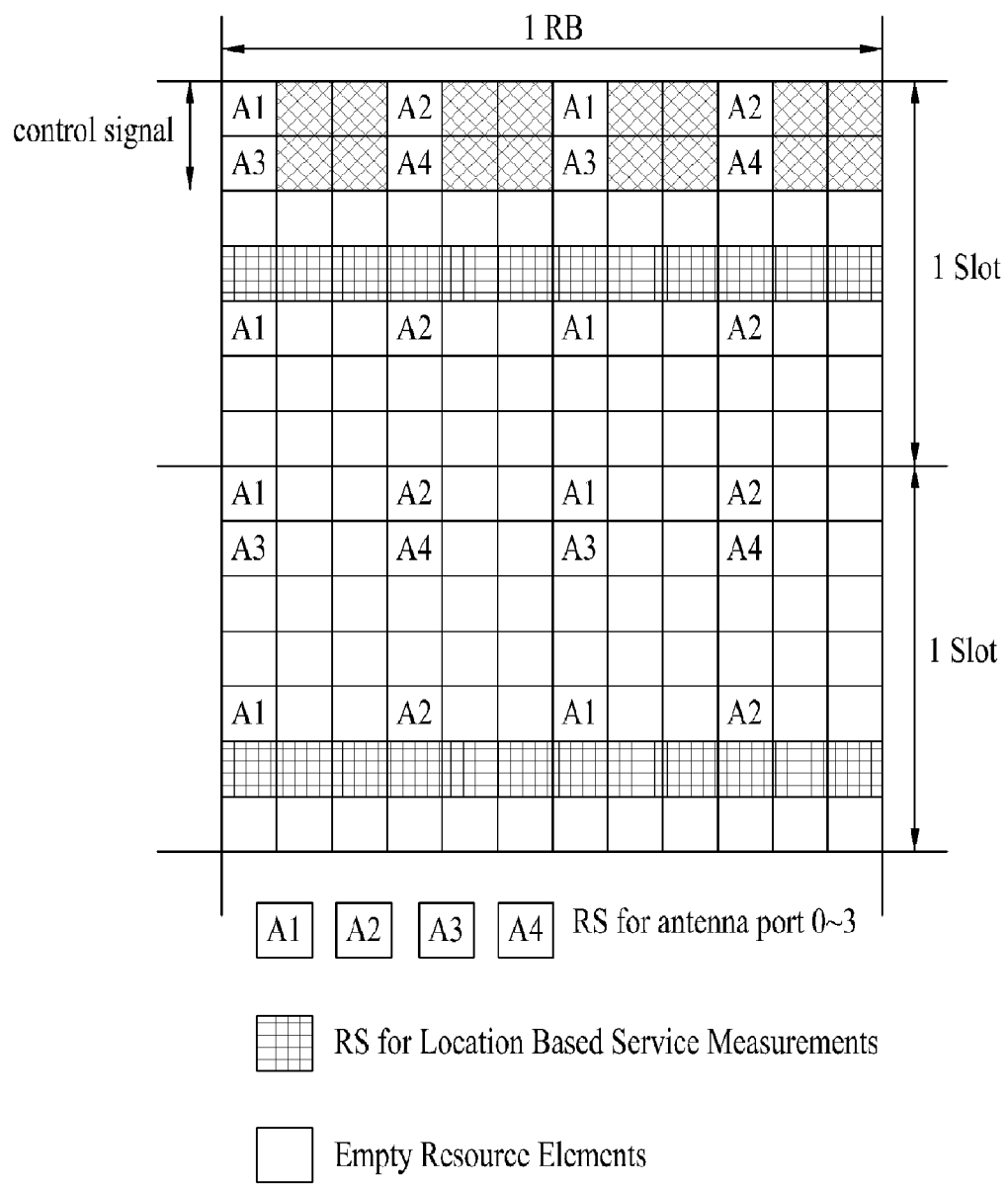

FIG. 16 illustrates another pattern (hereinafter referred to as the pattern A3) in which consecutive reference signals are arranged in specific OFDM symbols within the entire subframe for location management. It is impossible for the pattern A3 to guarantee orthogonality among all patterns received from cells, whereas the pattern A2 can guarantee orthogonality among patterns having different values $v_{shift}$.

In the case of using the pattern A3, in order to prevent collision among LBS-RSs transmitted from several cells, only a predetermined number of OFDM symbols can be used in one subframe. If it is assumed that LBS-RS transmission OFDM symbols are established to prevent a collision caused by the above-mentioned propagation delay, it is possible for the pattern A3 to guarantee the same orthogonality as in the pattern A2.

Figure 17:
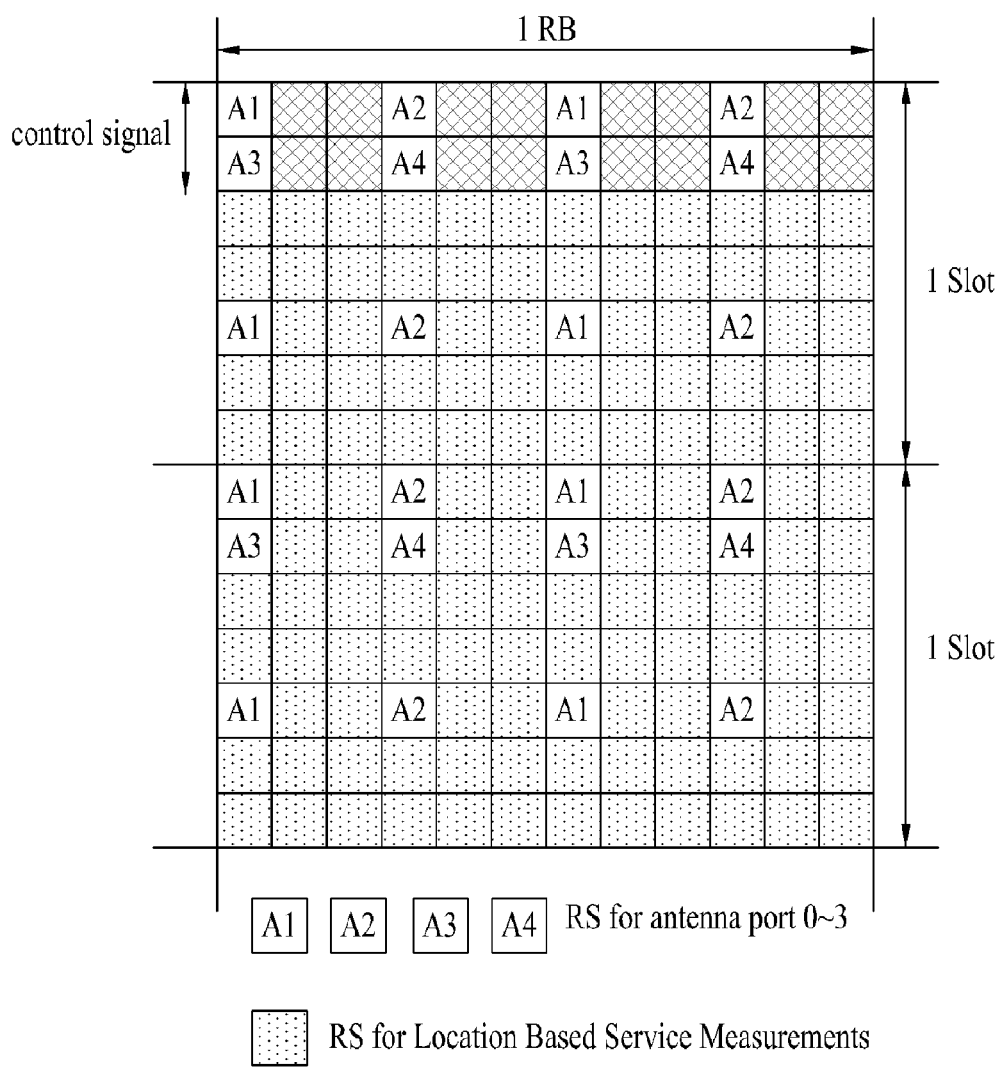

FIG. 17 illustrates another pattern (hereinafter referred to as a pattern A4) in which a reference signal is transmitted in the entire subframe other than both a resource region and a PDCCH region. In this case, the resource region is used for a Common-Reference Signal (Common-RS) of each of antenna ports 0 to 3. Basically, the pattern A4 uses an LBS-RS sequence longer than those of the above-mentioned patterns, and uses a cross correlation value of the LBS-RS sequence so as to identify LBS-RSs received from different cells. Therefore, the higher the cross correlation value of the LBS-RS, the higher the efficiency of the pattern A4.

Figure 18:
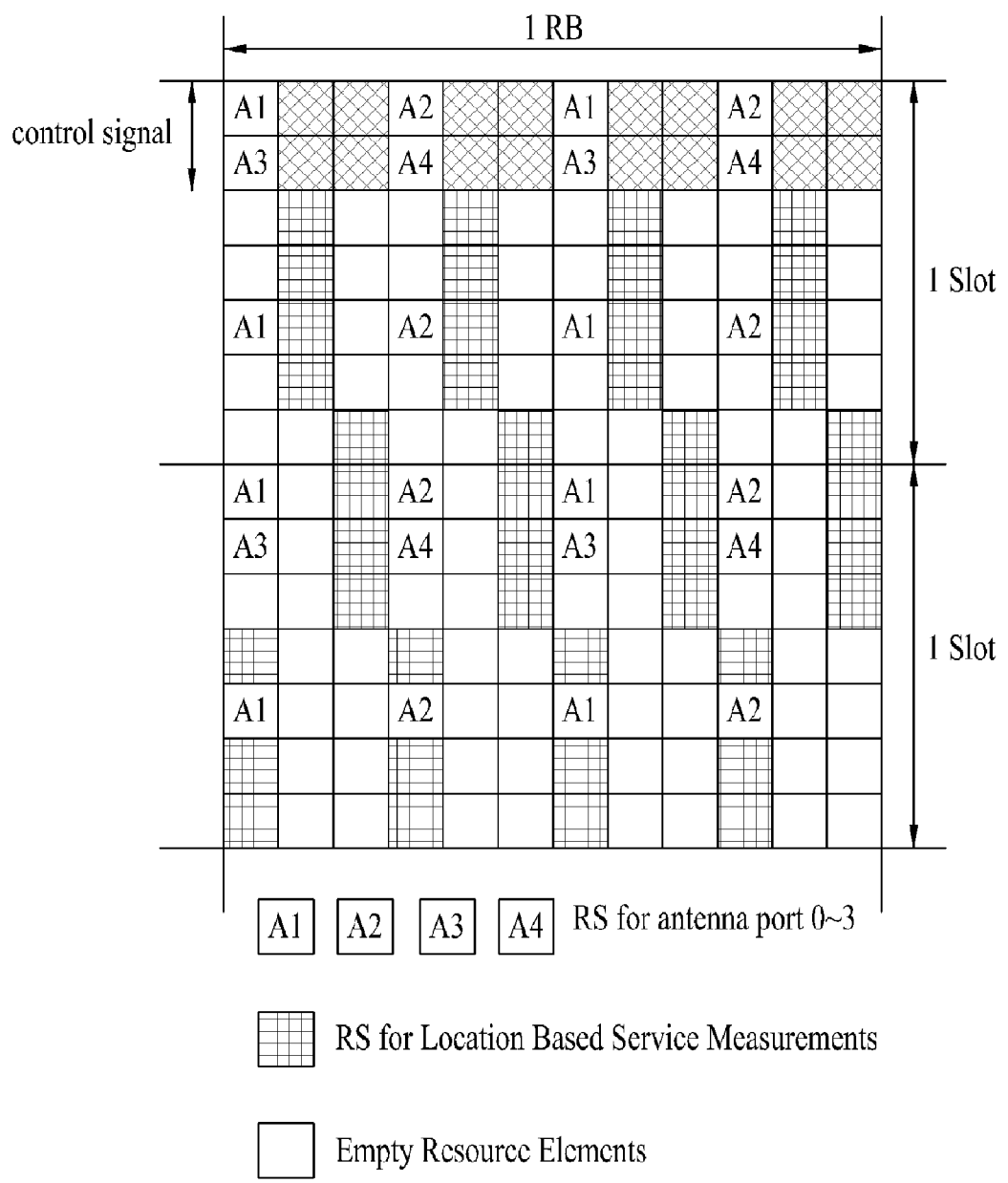

FIG. 18 illustrates another pattern A5 in which the pattern A1 is combined with the other pattern A2. Referring to FIG. 18, in the case of the pattern A5, LBS-RSs are allocated to a predetermined number of OFDM symbols of a certain subcarrier, and are then allocated to the same number of OFDM symbols in a subcarrier to which an offset is applied.

As described above, a maximum propagation delay can be calculated on the basis of the cell size. If it is assumed that the maximum propagation delay is 0.33 ms (that is, about 4 OFDM symbols), the LBS-RS is transmitted through the same subcarriers under the above-mentioned maximum propagation delay (i.e., 4 OFDM symbols) as shown in FIG. 18. In this case, LBS-RS patterns transmitted from other cells use different values $v_{shift}$, such that collision with any LBS-RSs received from other cells is prevented.

However, in the case where the LBS-RS is transmitted only using a predetermined number of subcarriers, this means that a waveform is repeated a predetermined number of times in a time domain. This waveform repetition means that a plurality of cross correlation peaks is generated in a signal detection process, possibly having a negative influence upon signal detection. Therefore, in the case of the pattern A5, after the LBS-RS is transmitted through the predetermined number of OFDM symbols, the subcarrier is shifted by an offset value (i.e., one subcarrier in FIG. 18), so that the LBS-RS is transmitted though the same number of OFDM symbols. If the subcarrier shifting is carried out the predetermined number of times, the LBS-RS can be transmitted through all subcarrier bands. However, resource elements (REs) for transmitting the LBS-RS in one OFDM symbol are not consecutive but are scattered, so that the base station must consume a large amount of power to transmit the LBS-RS.

In the above-mentioned LBS-RS patterns, the reference signals for antenna ports, other than a reference signal located in the PDCCH region, may not be transmitted. Specifically, when transmitting the LBS-RS in Multicast/Broadcast over a Single Frequency Network (MBSFN) subframe, the MBSFN subframe uses only the first two OFDM symbol regions as a PDCCH region and a specific area for an antenna-port reference signal (e.g., Common-RS), and the remaining regions other than the first two OFDM symbol regions are used for other purposes, so that flexibility in LBS-RS allocation can be guaranteed. In other words, differently from the above-mentioned patterns, LBS-RS transmission may be established in a region where reference signals for antenna ports (i.e., Common-RSs) are transmitted.

In the meantime, in order to provide location measurement having the same accuracy as both an example of a normal CP and an example of an extended CP, it is necessary for the number of REs for LBS-RSs contained in one RB to be identical to each other.

Next, a method for allowing the serving cell to transmit information of an LBS-RS bandwidth established in the target cell participating in location measurement, a CP length, and information of a transmission (Tx) antenna to the MS will hereinafter be described, such that the MS is prevented from performing blind-decoding for acquiring an antenna port number related to LBS-RS transmission, an LBS-RS bandwidth, a CP length, and information of the number of transmission antennas. Since the serving cell performs signaling of the above-mentioned information to the MS, the MS can reduce complexity in a method for implementing LBS-RS detection, resulting in reduction in MS cost. In this case, the serving cell may be defined as a cell for providing information of location measurement. If the serving cell informs the MS of the LBS-RS bandwidth of the target cell, CP length, and information of transmission antennas, the MS can acquire the remaining information (e.g., $v_{shift}$) through blind decoding.

In order to transmit the above-mentioned information to the MS, a variety of methods may be used, for example, a method for broadcasting information using system information transmitted over a broadcast channel, a method for signaling information through a message transmitted from an upper layer (e.g., RRC layer or MAC layer), a method for transmitting information over a downlink physical control channel (e.g., PDCCH), and the like.

In the meantime, information about system setup of the target cell is compared with system setup information of the serving cell, such that the comparison result may indicate only whether the target cell and the serving cell have the same system setup information, resulting in reduction of signaling overhead. In this case, the term "system setup" may indicate combination of a variety of information capable of being used as parameters for LBS-RS detection, for example, information about LBS-RS bandwidth, information about CP length, and information about the number of transmission (Tx) antennas. For example, an indicator indicating whether system setup information of the target cell is identical to that of the serving cell can be transmitted to each of all candidate target cells. As another example, only one indicator may be signaled to all the candidate target cells as necessary. If information about the number of transmission antennas does not affect LBS-RS detection in the same manner as the above-mentioned case in which reference signals for antenna ports are not transmitted, information about the number of transmission (Tx) antennas may be omitted from the process for deciding the indicator.

In the meantime, if the system setup of one or more target cells is different from that of the serving cell, it is preferable that the serving cell separately perform signaling of system setup information of the target cells to the MS.

FIFTH EMBODIMENT

Next, a method for allocating resources using three LBS-RS patterns and LBS-RS pattern basis blocks according to the fifth embodiment of the present invention will hereinafter be described. In the case of the LBS-RS pattern disclosed in the second embodiment, no resources for LBS-RS are allocated to OFDM symbols allocated to the PDCCH region. This means that first three OFDM symbols are not allocated as LBS-RS resources in a general subframe, and first two OFDM symbols are not allocated as LBS-RS resources in the MBSFN subframe.

Figure 19:
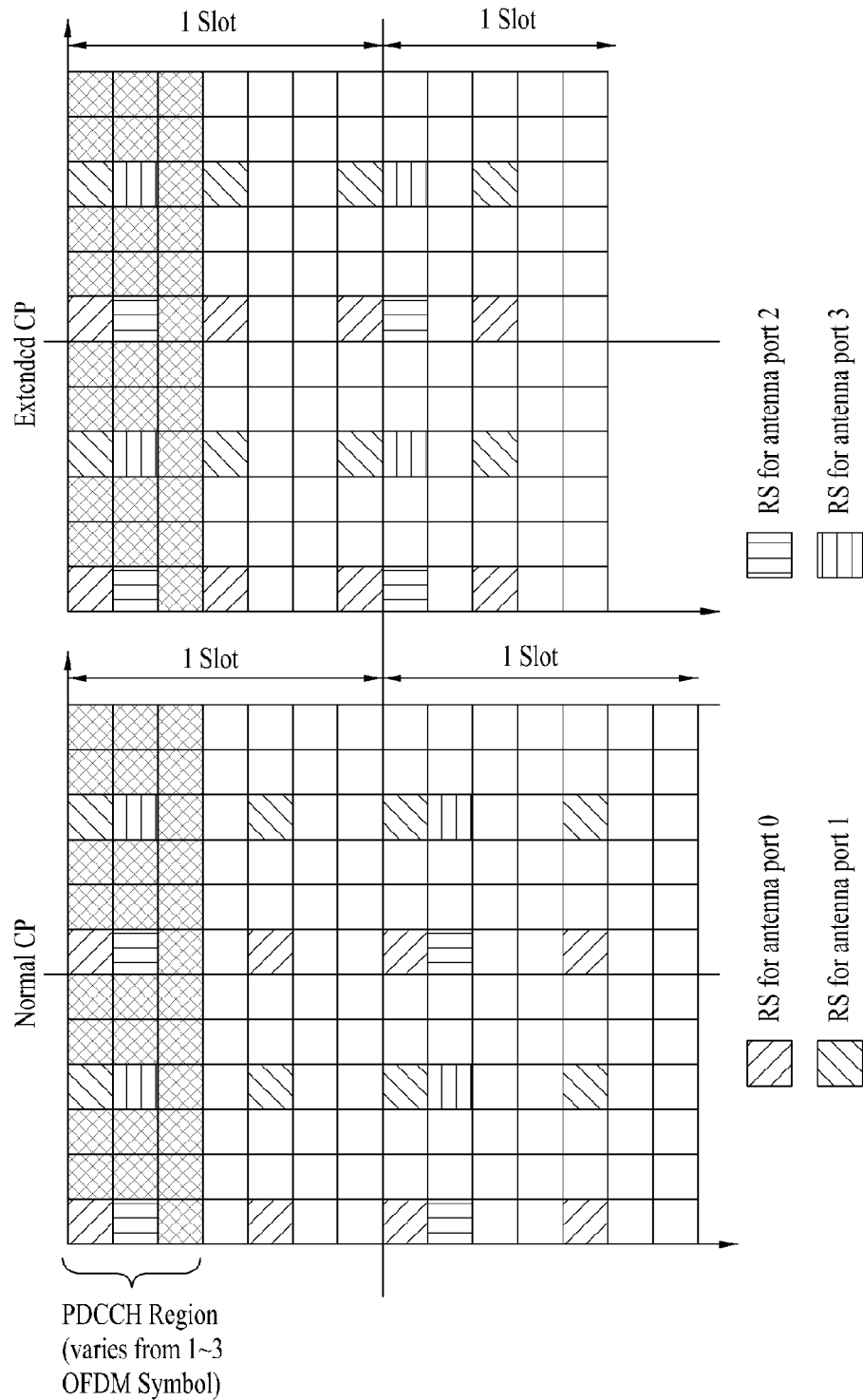
FIGS. 19 to 27 illustrate a fifth embodiment of the present invention.

A first pattern from among three patterns illustrates that a base station (BS) having four transmission (Tx) antennas transmits the general subframe. In the first pattern, no OFDM symbols for LBS-RS are allocated to other OFDM symbols to be allocated to reference signals for transmission (Tx) antennas. Referring to FIG. 19, the number of OFDM symbols capable of transmitting the LBS-RS in one subframe having a normal CP is set to 7. The number of OFDM symbols capable of transmitting the LBS-RS in one subframe having an extended CP is set to 5. In the case of the general CP, only 5 OFDM symbols can be used in such a manner that the subframe having the general CP has the same performance as in the other subframe having the extended CP.

The second pattern among three patterns illustrates that LBS-RS is transmitted using the MBSFN subframe, and OFDM symbols allocated to reference signals for transmission (Tx) antennas are allocated only to the PDCCH region. Therefore, the number of OFDM symbols capable of transmitting LBS-RS in one subframe having the general CP is set to 12, and the number of OFDM symbols capable of transmitting LBS-RS in one subframe having the extended CP is set to 10. In the case of the general CP, only 10 OFDM symbols can be used in such a manner that the subframe having the general CP has the same performance as in the other subframe having the extended CP.

The third pattern among three patterns illustrates that the general subframe is transmitted. Differently from the first pattern, OFDM symbols to be allocated to reference signals for transmission antennas may also be allocated to other OFDM symbols for LBS-RS. Therefore, the number of OFDM symbols capable of transmitting LBS-RS in one subframe having the general CP is set to 11, and the number of OFDM symbols capable of transmitting LBS-RS in one subframe having the extended CP is set to 9. In the case of the general CP, only 9 OFDM symbols can be used in such a manner that the subframe having the general CP has the same performance as in the other subframe having the extended CP. However, according to the third pattern, LBS-RS is not transmitted to resource elements (REs) to be allocated to reference signals for transmission antennas, but the reference signals for the transmission antennas are transmitted to the resource elements (REs).

In the above-mentioned three patterns, 2 OFDM symbols may not be used to enable the above three patterns to have the same performance as in the subframe having the extended CP. In this case, it is preferable that a specific region to which no reference signals for transmission antennas are allocated be unused.

Figure 20:
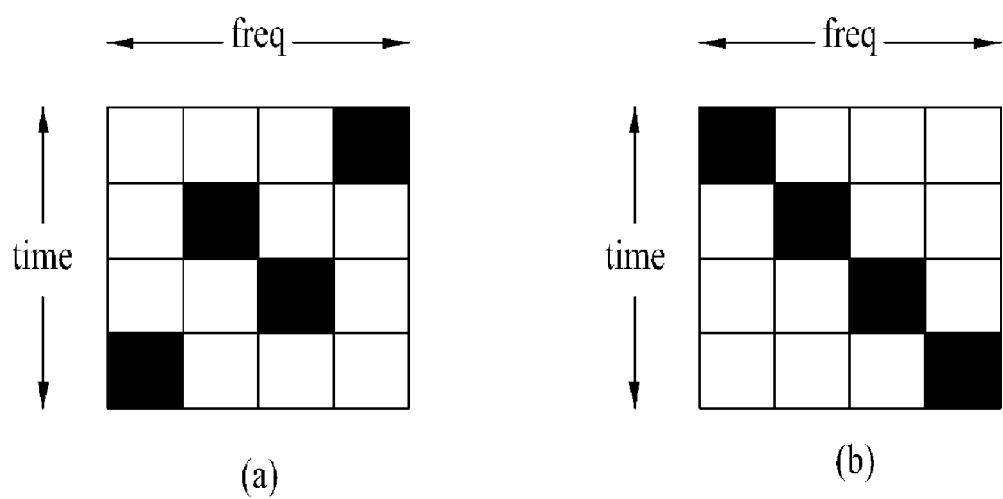

Next, the LBS-RS pattern basis blocks to be applied to the above-mentioned three patterns will be defined as follows. It is preferable that different cells use different LBS-RS pattern basis blocks. Referring to FIG. 20, the LBS-RS basis block may represent (N×N) resource elements (REs), and be configured in such a manner that only one LBS-RS is transmitted to respective rows and columns.

Next, a method for applying the LBS-RS basis pattern to the above three patterns will hereinafter be described in detail.

Figure 21:
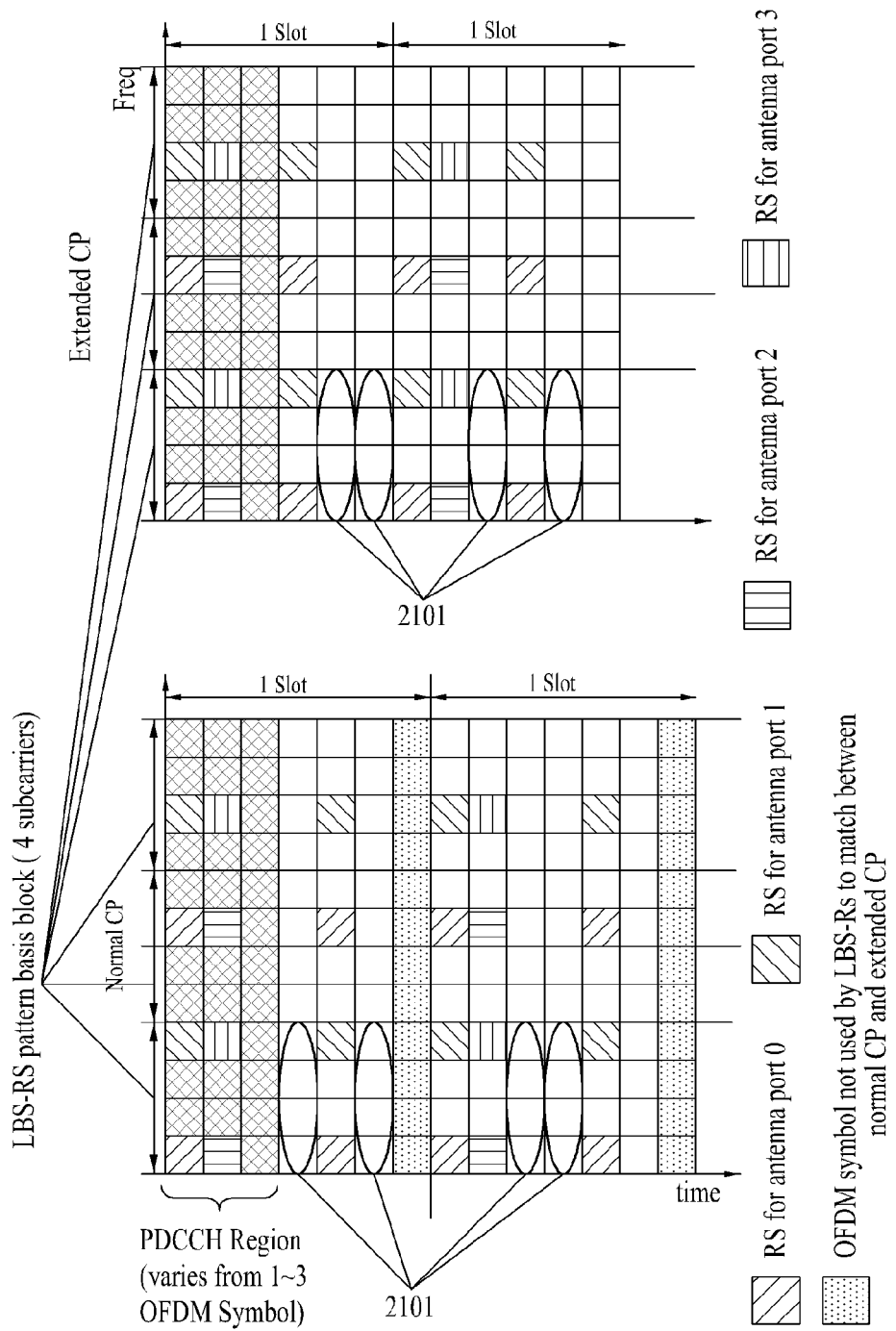

FIG. 21 illustrates that the LBS-RS pattern basis block composed of (4×4) resource elements is used in the first pattern. As can be seen from the reference numbers 210-1 in FIG. 21, 4 OFDM symbols from among 5 OFDM symbols are selected, and the LBS-RS pattern basis block is inserted into each of the selected OFDM symbols. In this case, three LBS-RS pattern basis blocks may be inserted into one resource block (RB), and three different blocks may be inserted according to a cell ID.

Figure 22:
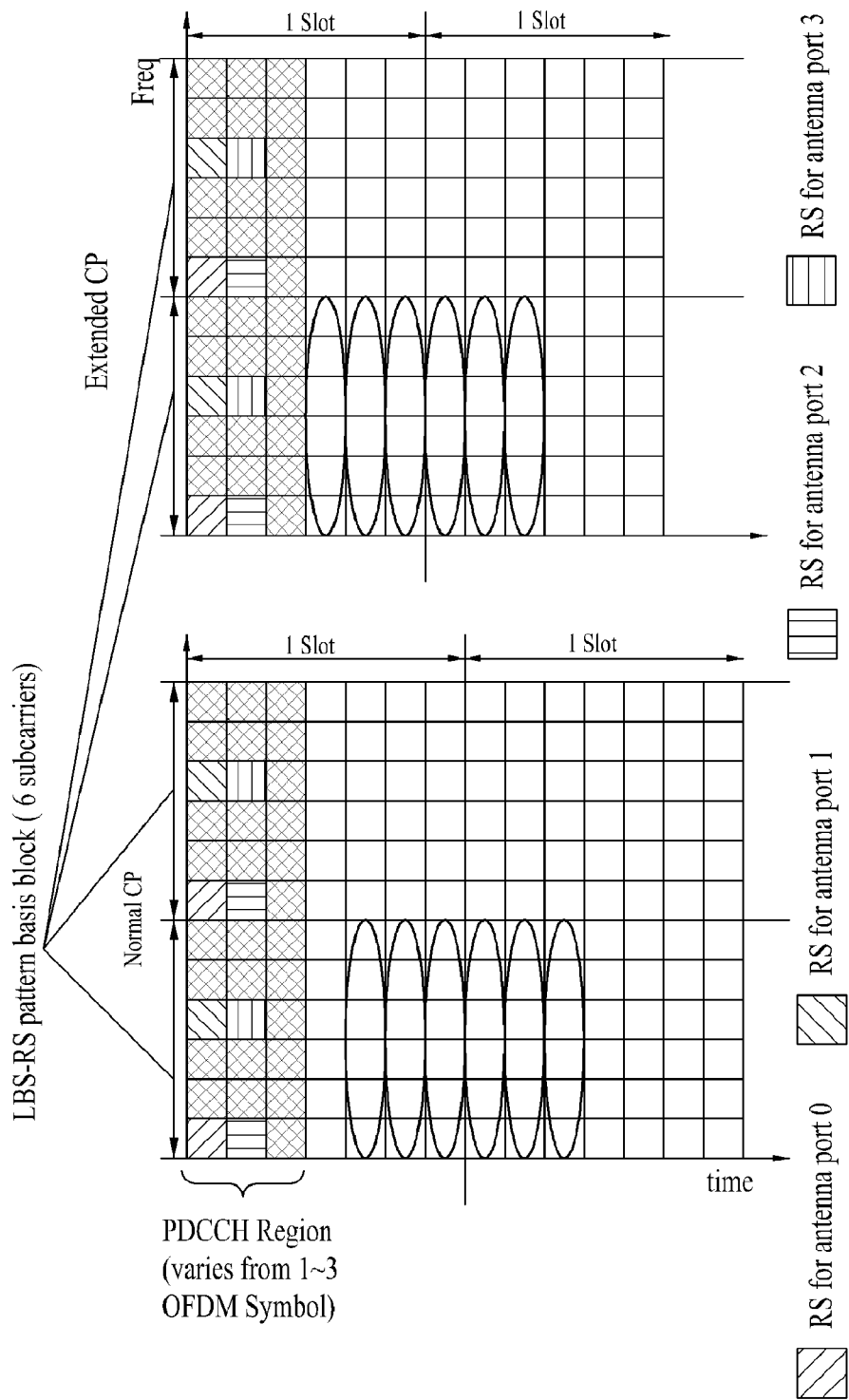
Figure 23:
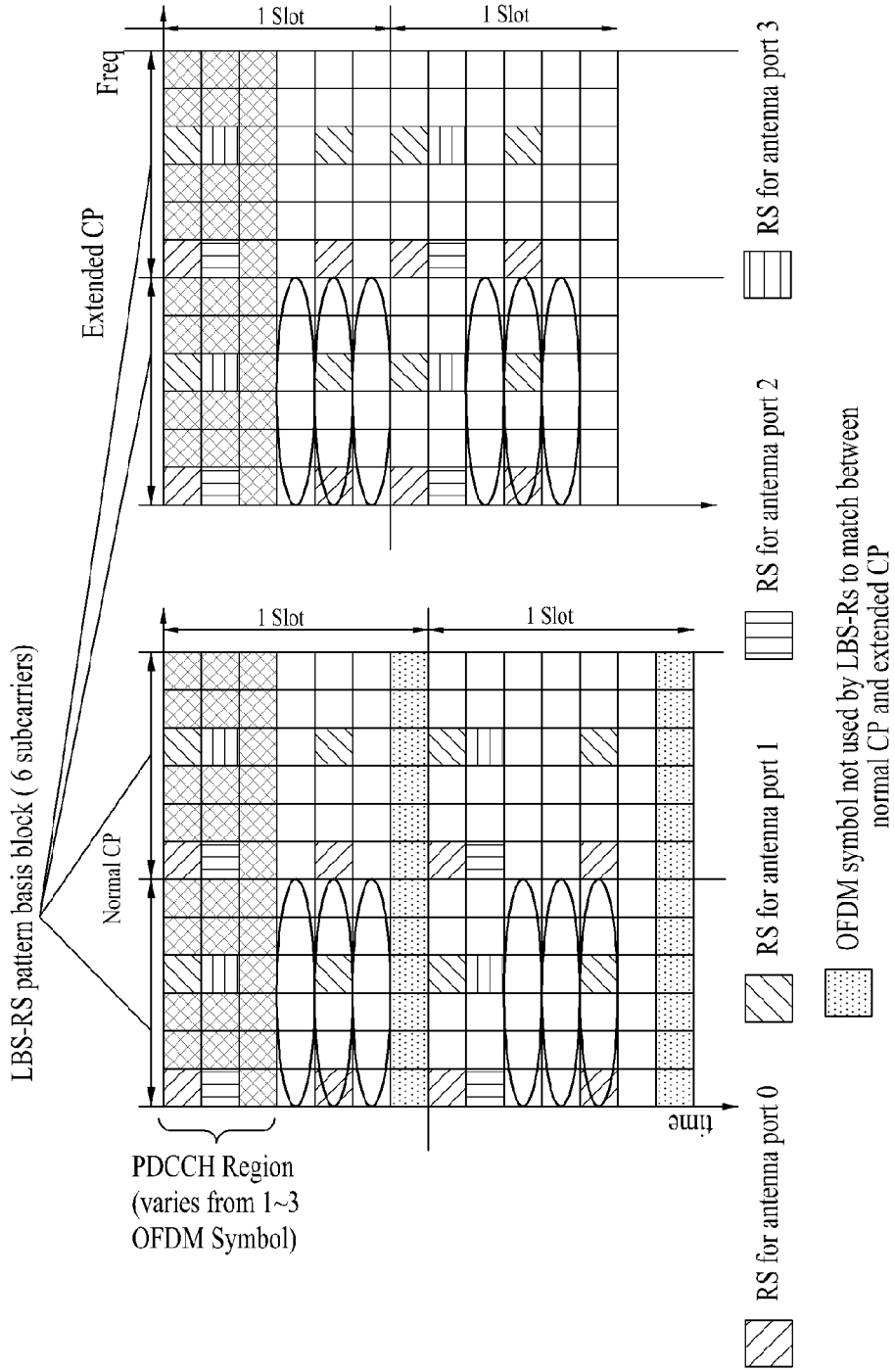

Likewise, FIG. 22 illustrates that the LBS-RS pattern basis block composed of (6×6) resource elements is used in the second pattern, and FIG. 23 illustrates that the LBS-RS pattern basis block composed of (6×6) resource elements is used in the third pattern. Specifically, as shown in FIG. 23, the LBS-RS is not transmitted to a resource element (RE) to be allocated to a reference signal for a transmission antenna, but the reference signal for the transmission antenna is transmitted to the reference signal.

Although the LBS-RS pattern basis blocks may be repeatedly applied in a frequency domain of one subframe, it can be recognized that sufficient OFDM symbols are present so that the LBS-RS pattern basis blocks cannot be repeatedly applied to a time domain. In this case, the present invention proposes a method for partially applying the LBS-RS pattern basis block repeated as shown in FIG. 24.

Figure 24:
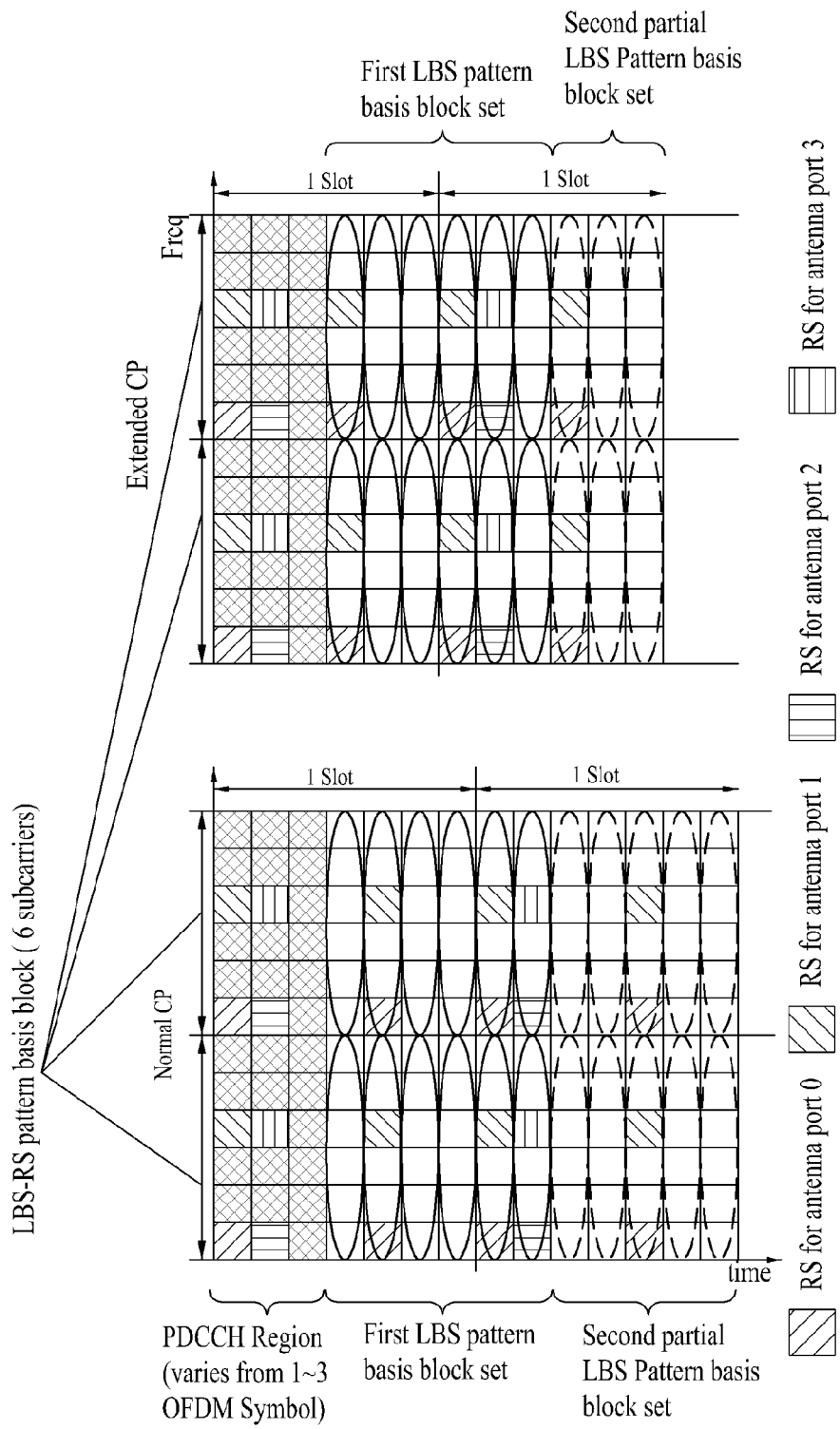

Referring to FIG. 24, in order to repeatedly transmit the first LBS-RS pattern basis block on a time domain, the second LBS-RS pattern basis block may be partially transmitted. In the case of using the first LBS-RS pattern basis block without any change, one case of using the first LBS-RS pattern basis block and the other case of using the second LBS-RS pattern basis block may be used at the same time as necessary. Preferably, as can be seen from FIG. 25, the other case of using an LBS-RS pattern basis block symmetrical to the first LBS-RS pattern basis block on a time axis may be used as necessary.

Figure 25:
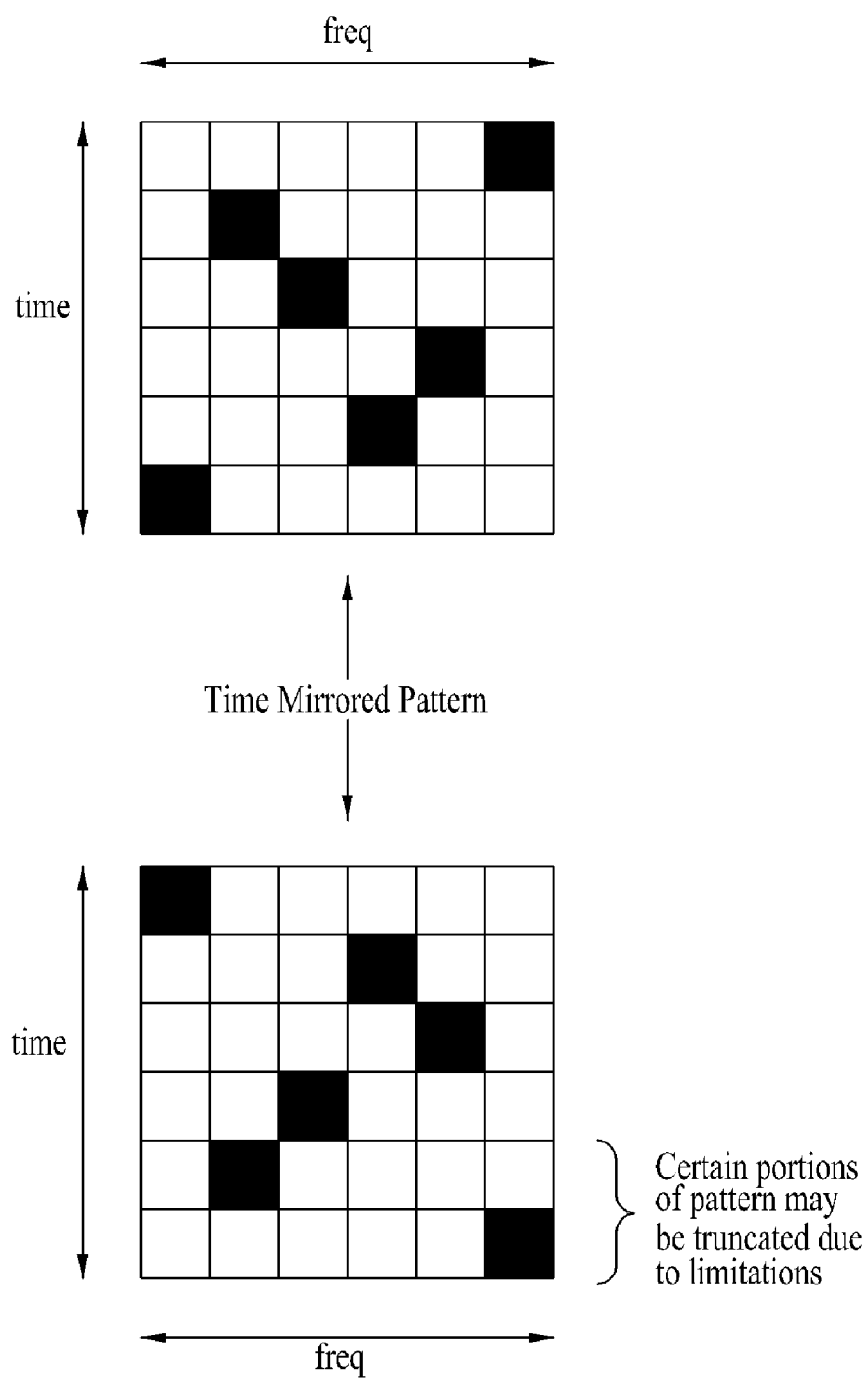

Referring to FIG. 25, the LBS-RS pattern basis block, that is symmetrical to the first LBS-RS pattern basis block on the time axis, may be effectively used in the case where no LBS-RS is transmitted in resource elements to be allocated to reference signals for transmission antennas as shown in FIG. 23. In other words, if it is assumed that certain resource elements are not allocated to the LBS-RS in the first LBS-RS pattern basis block due to the reference signals for transmission antennas, it is possible for resource elements not allocated to the LBS-RS to be allocated to different locations in the LBS-RS pattern basis block symmetrical to the first LBS-RS pattern basis block on the time axis.

Figure 26:
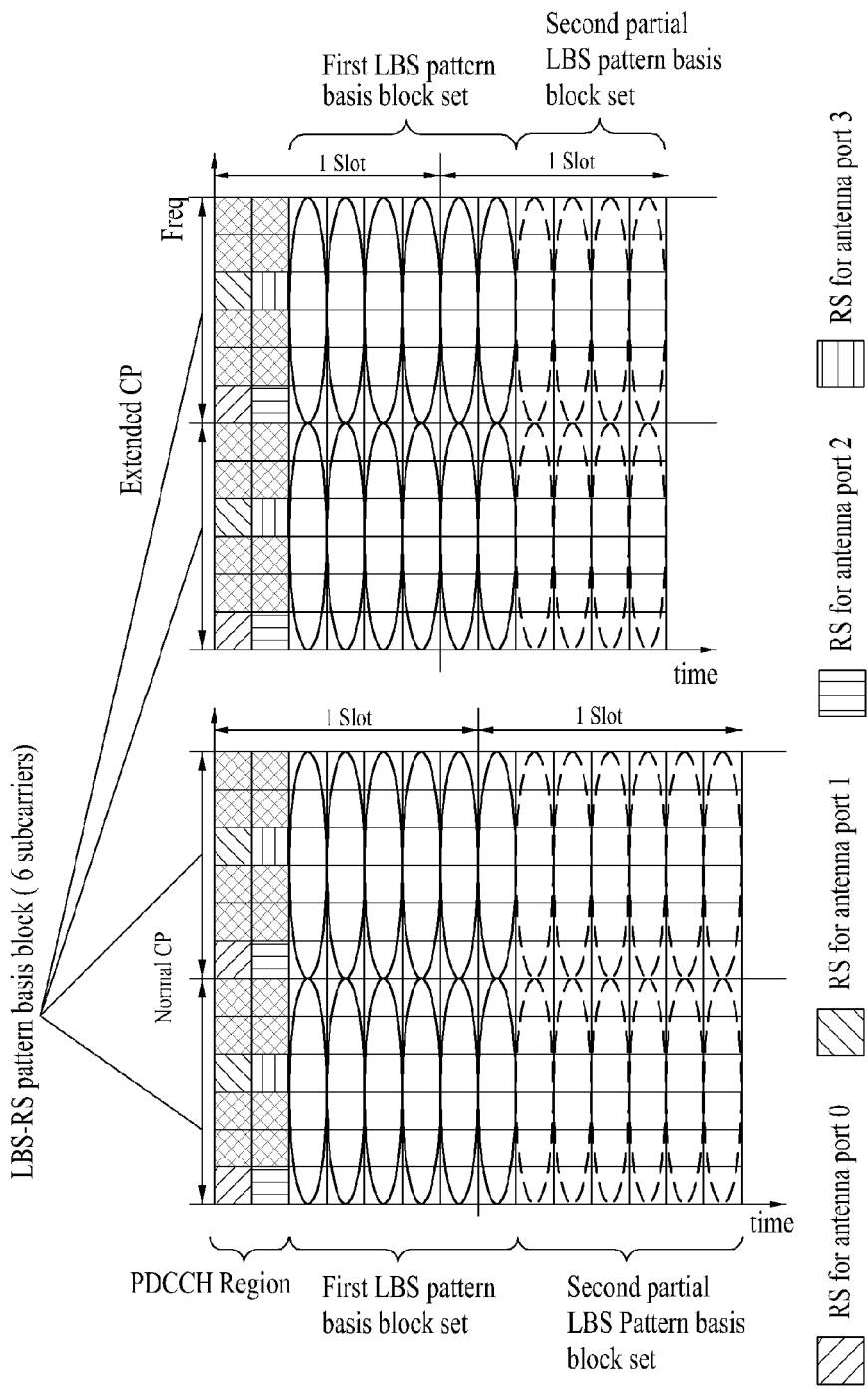

In addition, the LBS-RS pattern basis block symmetrical to the first LBS-RS pattern basis block on the time axis may also be applied to the MBSFN subframe as shown in FIG. 26. However, according to the MBSFN subframe, OFDM symbols to be allocated to reference signals for transmission antennas are present only in the PDCCH region, so that the above-mentioned LBS-RS pattern basis block symmetrical to the first LBS-RS pattern basis block may be used to prevent the first LBS-RS pattern basis block from being deteriorated due to inter-cell interference.

Figure 27:
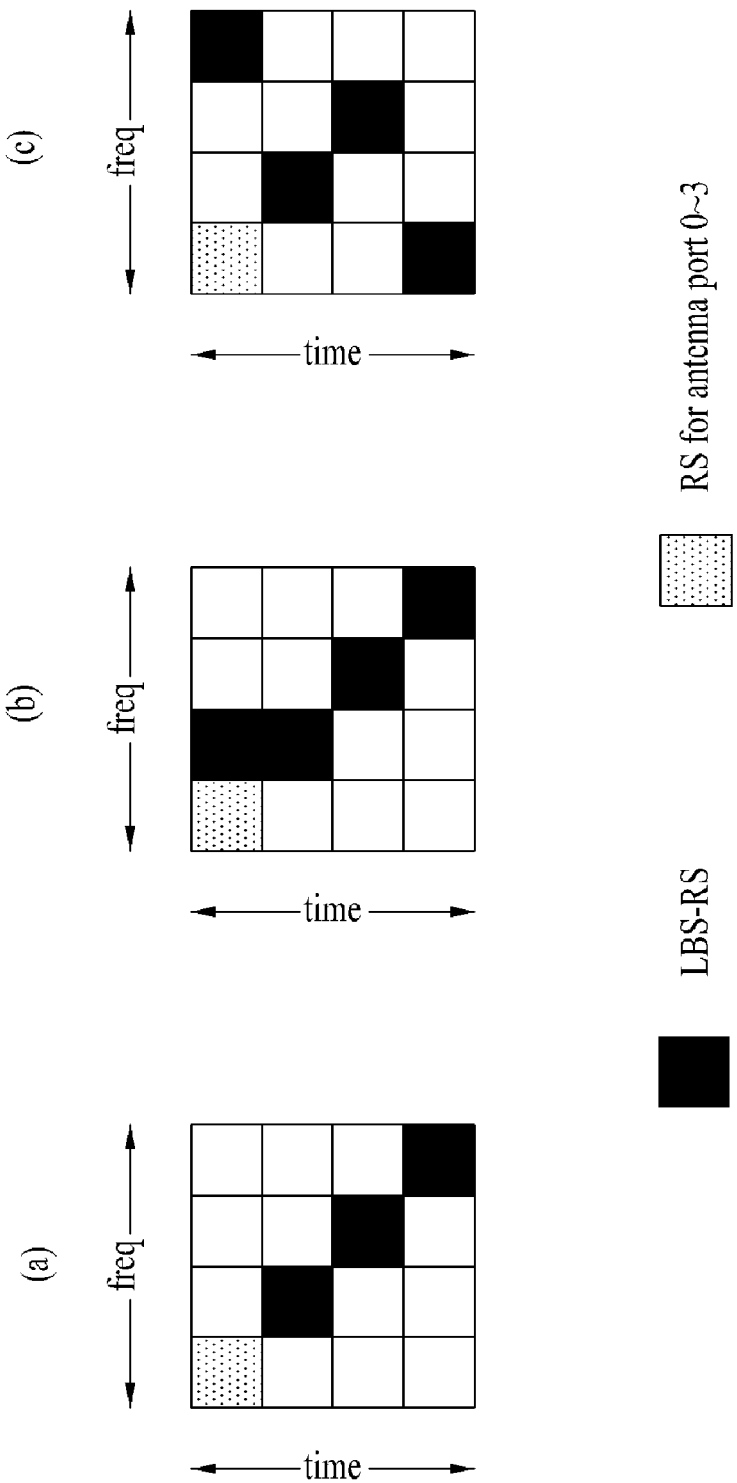

In the meantime, although the above-mentioned description has disclosed a method for constructing the LBS-RS pattern basis block using only resource elements for LBS-RS transmission, FIG. 27 illustrates a method of using the LBS-RS pattern basis block including even reference signals for transmission antennas.

According to the LBS-RS pattern basis block shown in FIG. 27(a), one LBS-RS and one reference signal for transmission antenna are allocated to each of the frequency axis and the time axis. According to the LBS-RS pattern basis block shown in FIG. 27(b), a reference signal for transmission antenna is first allocated, and a resource element (RE) is allocated to LBS-RS in such a manner that the reference signal for transmission antenna does not overlap with the LBS-RS on a frequency domain. Finally, according to the LBS-RS pattern basis block shown in FIG. 27(c), a reference signal for transmission antenna is first allocated, and resource element allocation is carried out in such a manner that the reference signal for transmission antenna and the LBS-RS do not use the same resources.

SIXTH EMBODIMENT

Figure 28:
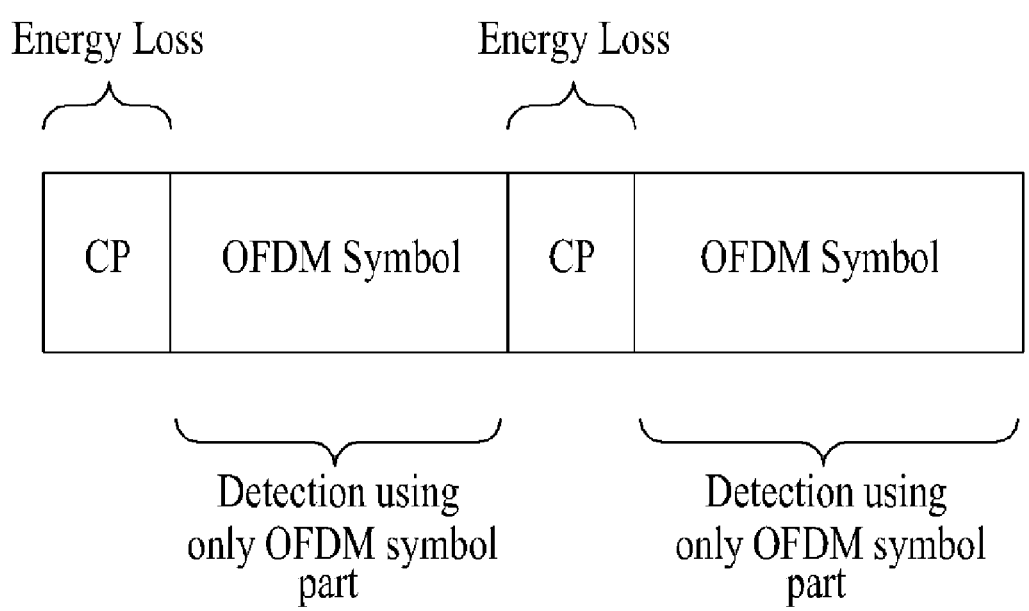
FIGS. 28 to 30 illustrate a sixth embodiment of the present invention.

Signal processing for use in the OFDM system is carried out in units of a symbol. Referring to FIG. 28, the cell maps the LBS-RS sequence to an OFDM symbol in order to transmit the LBS-RS, and CP insertion is carried out to protect the LBS-RS sequence from inter-symbol interference. Upon receipt of the above-mentioned result, the MS removes the inserted CP, and detects the LBS-RS sequence from the OFDM symbol. In the meantime, LBS-RS detection performance of the MS is largely dependent upon the reception signal power, spacing between subcarriers of the LBS-RS pattern, and LBS-RS bandwidth. In order to improve reception signal power, the sixth embodiment of the present invention reduces the number of CPs, and reduces the subcarrier spacing in such a manner that the LBS-RS can be transmitted over the longest OFDM symbol on the time axis.

First of all, if the subcarrier spacing of the LBS-RS pattern is reduced, the OFDM symbol is increased in length on the time domain, so that it is preferable that only a maximum number of OFDM symbols be contained in one subframe. In this case, if only one OFDM symbol is used for LBS-RS transmission, only one CP is inserted into a transmission signal. If a subframe is established as described above, the resultant subframe may allow the MS to receive the LBS-RS at a power level higher than that of another subframe including many OFDM symbols.

Figure 29:
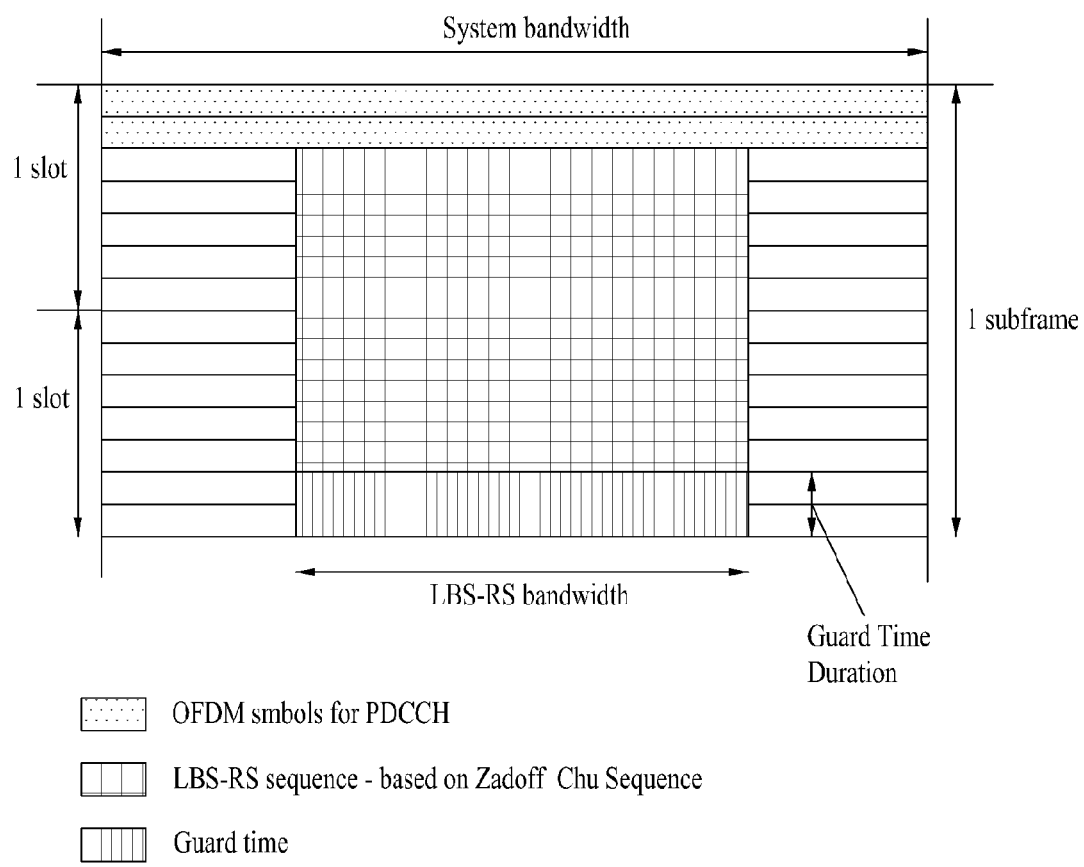

FIG. 29 illustrates that LBS-RS is multiplexed with other information in a frequency domain. However, in the case where the remaining regions other than the PDCCH region use the MBSFN subframe where it is not necessary to transmit reference signals for antenna ports, it is possible to transmit the LBS-RS using only one OFDM symbol.

In the meantime, it is preferable that the LBS-RS be generated using a Zadoff-Chu (ZC) sequence. The subcarrier spacing is reduced as shown in FIG. 29, such that the number of subcarriers mapped to ZC sequences can be effectively increased. Therefore, a long ZC sequence can be utilized, such that many more ZC root sequences capable of being utilized by different cells can be generated. In addition, a CP for reducing inter-symbol interference may be inserted, and the CP may also be omitted to use a longer ZC sequence as necessary. By adjusting the CP length, the MS may detect the LBS-RS using not only one Inverse Finite Fourier Transform (IFFT) but also a cross correlation detector without causing the inter-symbol interference.

Figure 30:
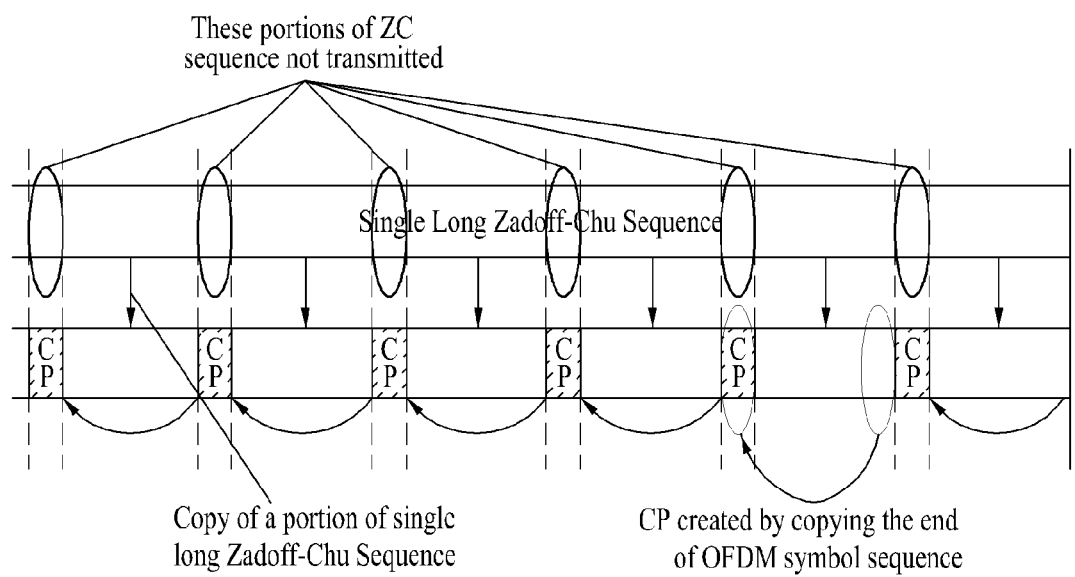

Another method for generating the LBS-RS sequence is shown in FIG. 30. In more detail, the ZC sequence is generated to be extended in a time domain, and the generated ZC sequence is partially mapped to individual OFDM symbols of the subframe. Individual parts of the ZC sequence are mapped to OFDM symbols, and the signal identical to some parts of the ZC sequences mapped to OFDM symbols is received as a CP.

SEVENTH EMBODIMENT

When transmitting the LBS-RS using the above-mentioned LBS-RS patterns mentioned in the fourth to sixth embodiments, a sequence allocated to a resource element (RE) may be either m-sequence identical to a Gold code sequence or ZC sequence in such a manner that a low cross correlation value between signals is maintained and the MS can quickly measure a delay time of the LBS-RS.

Figure 31:
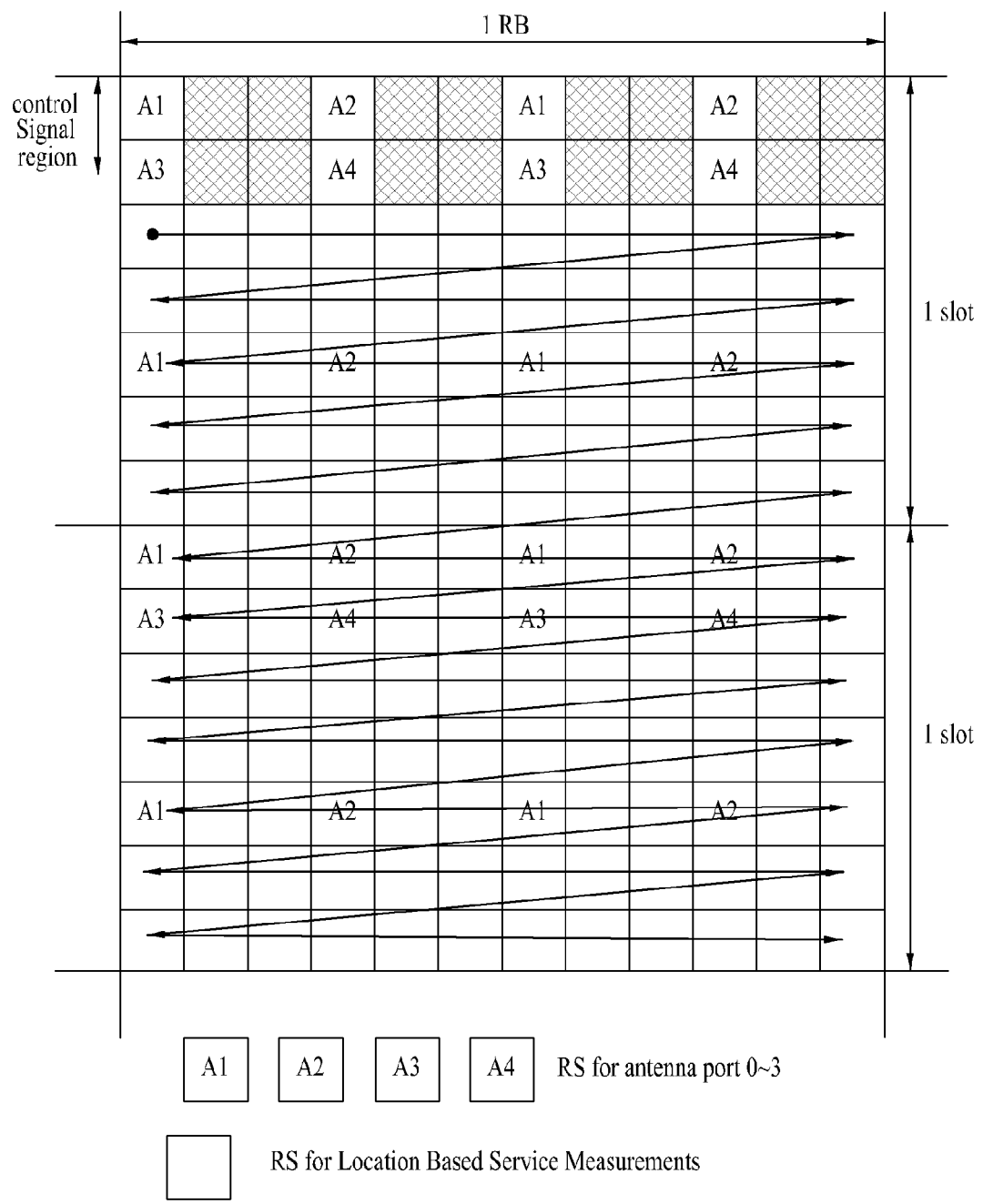
FIGS. 31 and 32 illustrate a seventh embodiment of the present invention.

Specifically, in the case of using the ZC sequence, it is preferable that one long ZC sequence be used as shown in FIG. 31. In this case, the ZC sequence is mapped along a frequency axis of one slot, and is mapped along a frequency axis of the next slot, such that sequences can be allocated to resource elements (REs).

In addition, a method for mapping different ZC root sequences to all OFDM symbols may be used. If the same sequence is allocated to each OFDM symbol, it may be difficult for the MS to discriminate among individual OFDM symbols, and an unexpected error may be encountered.

Figure 32:
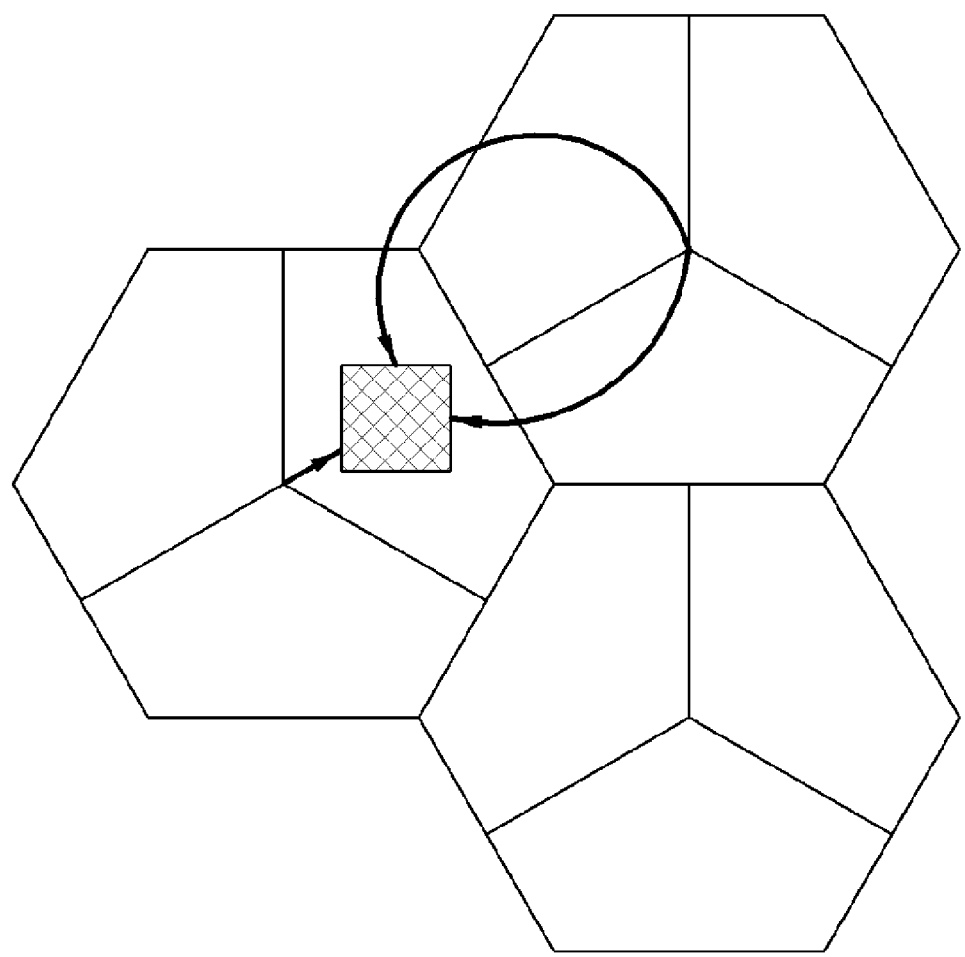

In recent times, a wireless communication system is constructed by sectorization of several cells. For example, as can be seen from FIG. 32, transmission antennas having different directivities are collected in one physical location so that a plurality of cells may be implemented.

Therefore, only one of LBS-RSs transmitted from the same geographical location is meaningful in terms of location measurement. From the viewpoint of the MS, a process for measuring time delays of LBS-RSs transmitted from the same geographical location is considered to be meaningless, and it is necessary for the MS to additionally receive LBS-RSs from other cells, such that it is necessary for the network to inform the UE of specific information indicating what cells have been constructed at the same location.

Figure 33:
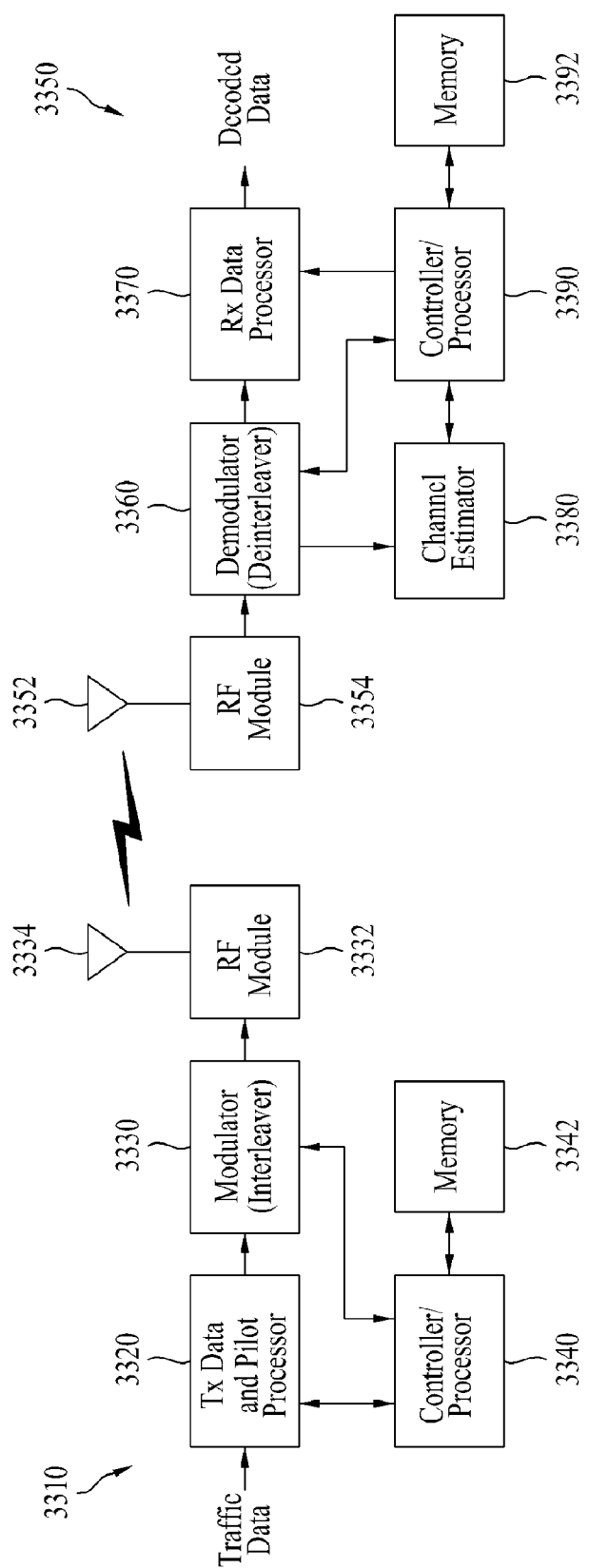
FIG. 33 is a block diagram illustrating a transmitter and a receiver according to one embodiment of the present invention.

FIG. 33 is a block diagram illustrating a transmitter and a receiver according to one embodiment of the present invention. In a downlink, a transmitter 3310 is used as a part of a base station, and a receiver 3350 is used as a part of a mobile station. In an uplink, a transmitter 3310 is used as a part of a mobile station, and a receiver 3350 is used as a part of a base station.

Referring to FIG. 33, in the transmitter 3310, a transmission (Tx) data and pilot processor (e.g., Tx Data and Pilot Processor) 3320 encodes data (for example, traffic data and signaling), interleaves the encoded data, and performs symbol mapping on the interleaved data, thus generating data symbols. The Tx data and pilot processor 3320 generates pilot symbols, so that the data symbols are multiplexed with the pilot symbols.

Figure 34:
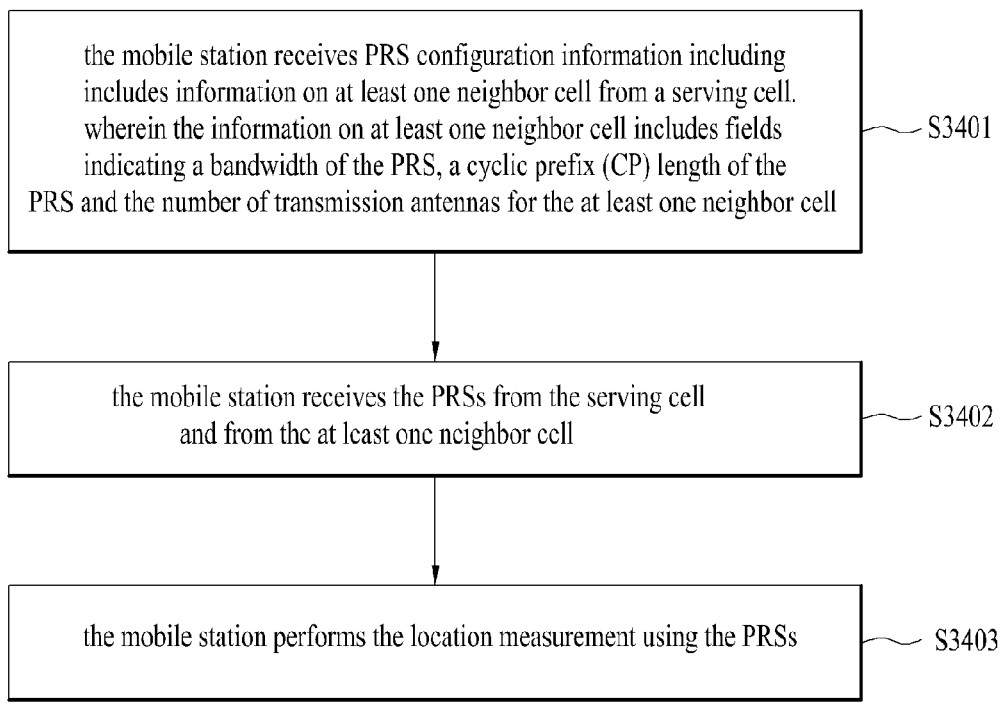
FIG. 34 is a diagram illustrating an example of a method for receiving positioning reference signals (PRSs) at a mobile station in a wireless communication system in accordance with one embodiment of the present invention.

FIG. 34 is a diagram illustrating an example of a method for receiving positioning reference signals (PRSs) at a mobile station in a wireless communication system in accordance with one embodiment of the present invention. Referring to FIG. 34, a transceiving module of the mobile station receives PRS configuration information including information on at least one neighbor cell from a serving cell. (S3401). The information on at least one neighbor cell includes fields indicating a bandwidth of the PRS, a cyclic prefix (CP) length of the PRS and the number of transmission antennas for the at least one neighbor cell. Further, the transceiving module of the mobile station receives the PRSs from the serving cell and from the at least one neighbor cell (S3402). A processor of the mobile station then performs the location measurement using the PRSs (S3403).

The modulator 3330 generates transmission symbols according to a wireless access scheme. The wireless access scheme may be FDMA, TDMA, CDMA, SC-FDMA, MC-FDMA, OFDMA, or a combination thereof. Also, the modulator 3330 may distribute and transmit data over time and frequency domains using various permutation methods according to embodiments of the present invention. A radio frequency (RF) module 3332 generates an RF signal by processing the transmission symbols (e.g. digital-to-analog conversion (ADC), amplification, filtering, and frequency up-conversion) and transmits the RF signal through an antenna 3334.

In the receiver 3350, an antenna 3352 receives a signal from the transmitter 3310 and provides the received signal to an RF module 3354. The RF module 3354 provides input samples to a demodulator 3360 by processing the received signal (e.g., filtering, amplification, frequency down-conversion, and analog-to-digital conversion).

The demodulator 3360 acquires data values and pilot values by demodulating the input samples. A channel estimator 3380 derives channel estimation values on the basis of the pilot values received from the demodulator 3360. Also, the demodulator 3360 detects (or equalizes) data from the received data values using the channel estimation values and provides data symbol estimation values for the transmitter 3310. The demodulator 3360 may also reorder data distributed across time and frequency domains in their original order by de-permutation corresponding to the various permutation schemes according to the embodiments of the present invention. A Reception (Rx) data processor 3370 symbol-demaps, deinterleaves, decodes the data symbol estimation values, and provides decoded data.

In general, the demodulator 3360 and the Rx data processor 3370 of the receiver 3350 operate complimentarily with the modulator 3330 and the Tx data and pilot processor 3320 of the transmitter 3310, respectively.

Controllers/processors 3340 and 3390 manage and control the operations of various processing modules in the transmitter 3310 and the receiver 3350, respectively. Memories 3342 and 1332 store program codes and data used for the transmitter 3310 and the receiver 3350, respectively.

The modules illustrated in FIG. 33 are disclosed only for illustrative purposes. The transmitter and/or the receiver may further include a necessary module, some of the modules/functions of the transmitter and/or the receiver may be omitted, a single module may be divided into different modules, and two or more modules may be incorporated into a single module.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

As can be seen from the embodiments of the present invention, a base station for use in a wireless communication system can effectively transmit an LBS-RS.

As apparent from the above description, although the above-mentioned uplink signal transmission method and apparatus for use in a Multiple Input Multiple Output (MIMO) wireless communication system have been disclosed on the basis of application examples for the 3GPP LTE system, the inventive concept of the present invention is applicable not only to the 3GPP LTE system, but also to other mobile communication systems, each of which transmits LBS-RS for measuring the MS location.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving positioning reference signals (PRSs) at a mobile station in a wireless communication system, the method comprising:
   receiving PRS configuration information from a serving cell;
   receiving the PRSs from the serving cell and at least one neighbor cell participating in location measurement; and
   performing the location measurement using the PRSs,
   wherein the PRS configuration information includes information on at least one neighbor cell, and
   wherein the information on the at least one neighbor cell includes fields indicating at least a bandwidth of a PRS, a cyclic prefix (CP) length of the PRS or a number of transmission antennas for the at least one neighbor cell.

2. The method according to claim 1, wherein the field indicating the bandwidth of the PRS is included in the information on at the least one neighbor cell if the bandwidth of the PRS for the at least one neighbor cell is not the same as a bandwidth of the PRS for the serving cell.

3. The method according to claim 1, wherein the field indicating the CP length of the PRS is included in the information on at the least one neighbor cell if the CP length of the PRS for the at least one neighbor cell is not the same as a CP length of the PRS for the serving cell.

4. The method according to claim 1, wherein the field indicating the number of transmission antennas is included in the information on the at least one neighbor cell if the number of transmission antennas for the at least one neighbor cell is not the same as a number of transmission antennas for the serving cell.

5. The method according to claim 1, wherein the PRS configuration information is received through a system information block, a radio resource control (RRC) layer message, a media access control (MAC) layer message, or a downlink physical control channel.

6. The method according to claim 1, further comprising:
   measuring a reception delay time of the received PRSs; and
   transmitting the reception delay time to the serving cell.

7. The method according to claim 1, further comprising:
   configuring a frequency offset value of the PRS corresponding to the at least one neighbor cell based on a cell ID of the at least one neighbor cell, wherein the cell ID of the at least one neighbor cell is included in the information on the at least one neighbor cell.

8. A mobile station for use in a wireless communication system, the mobile station comprising:
a transceiving module for receiving positioning reference signal (PRS) configuration information from a serving cell and for receiving PRSs from the serving cell and from at least one neighbor cell participating in location measurement; and
a processor for performing location measurement using the PRSs,
wherein the PRS configuration information includes information on at least one neighbor cell, and
wherein the information on the at least one neighbor cell includes fields indicating at least a bandwidth of a PRS, a cyclic prefix (CP) length of the PRS or a number of transmission antennas of the at least one neighbor cell.

9. The mobile station according to claim 8, wherein the field indicating the bandwidth of the PRS is included in the information on at the least one neighbor cell if the bandwidth of the PRS for the at least one neighbor cell is not the same as a bandwidth of the PRS for the serving cell.

10. The mobile station according to claim 8, wherein the field indicating the CP length of the PRS is included in the information on at the least one neighbor cell if the CP length of the PRS for the at least one neighbor cell is not the same as a CP length of the PRS for the serving cell.

11. The mobile station according to claim 8, wherein the field indicating the number of transmission antennas is included in the information on at the least one neighbor cell if the number of transmission antennas for the at least one neighbor cell is not the same as a number of transmission antennas for the serving cell.

12. The mobile station according to claim 8, wherein the transceiving module receives the PRS configuration information through a system information block, a radio resource control (RRC) layer message, a media access control (MAC) layer message, or a downlink physical control channel.

13. The mobile station according to claim 8, wherein:
the processor is further for measuring a reception delay time of the received PRSs; and
the transceiving is further for transmitting the reception delay time to the serving cell.

14. The mobile station according to claim 8, wherein the processor is further for configuring frequency offset value of the PRS corresponding to the at least one neighbor cell based on a cell ID of the at least one neighbor cell, the cell ID of the at least one neighbor cell included in the information on the at least one neighbor cell.

* * * * *